United States Patent
Bauder et al.

(10) Patent No.: US 8,401,500 B1
(45) Date of Patent: Mar. 19, 2013

(54) HIGH-EFFICIENCY LOW-COST POWER SUPPLY FOR RADIO FREQUENCY SYSTEMS

(75) Inventors: Ruediger Bauder, Feldkirchen-Westerham (DE); Nadim Khlat, Midi-Pyrenees (FR); Edward T. Spears, Oak Ridge, NC (US); Jean-Frederic Chiron, Tournefeuille (FR); Philippe Gorisse, Midi-Pyrennees (FR)

(73) Assignee: RF Micro Devices, Inc., Greensboro, NC (US)

( * ) Notice: Subject to any disclaimer, the term of this patent is extended or adjusted under 35 U.S.C. 154(b) by 256 days.

(21) Appl. No.: 12/706,544

(22) Filed: Feb. 16, 2010

Related U.S. Application Data

(60) Provisional application No. 61/152,540, filed on Feb. 13, 2009, provisional application No. 61/242,494, filed on Sep. 15, 2009.

(51) Int. Cl.
*H01Q 11/12* (2006.01)
*H04K 3/00* (2006.01)

(52) U.S. Cl. .................... 455/127.1; 330/127

(58) Field of Classification Search .... 455/127.1–127.5; 330/127, 130, 134, 199, 297
See application file for complete search history.

(56) References Cited

U.S. PATENT DOCUMENTS

| | | | |
|---|---|---|---|
| 5,414,614 A | 5/1995 | Fette et al. | |
| 6,055,168 A | 4/2000 | Kotowski et al. | |
| 6,188,274 B1 | 2/2001 | Vernon | |
| 6,563,235 B1 | 5/2003 | McIntyre et al. | |
| 6,927,441 B2 | 8/2005 | Pappalardo et al. | |
| 7,457,592 B2 * | 11/2008 | Arayashiki | 455/108 |
| 7,531,996 B2 | 5/2009 | Yang et al. | |
| 7,557,641 B2 | 7/2009 | Georgescu et al. | |
| 7,602,232 B2 | 10/2009 | Georgescu et al. | |
| 7,705,560 B2 | 4/2010 | Johnson | |
| 7,990,742 B2 | 8/2011 | Lesso | |
| 8,044,706 B2 | 10/2011 | Saman et al. | |
| 8,089,788 B2 | 1/2012 | Jain | |
| 2004/0167407 A1 | 8/2004 | Roberts | |
| 2007/0182490 A1 * | 8/2007 | Hau et al. | 330/297 |
| 2007/0236197 A1 * | 10/2007 | Vo | 323/282 |
| 2008/0220826 A1 * | 9/2008 | Dagher et al. | 455/572 |
| 2011/0101938 A1 | 5/2011 | Ma et al. | |
| 2011/0227633 A1 | 9/2011 | Mo et al. | |
| 2012/0062205 A1 | 3/2012 | Levesque et al. | |

FOREIGN PATENT DOCUMENTS

WO WO2009067591 A2 5/2009

OTHER PUBLICATIONS

Non-final Office Action for U.S. Appl. No. 13/013,986 mailed Jun. 28, 2012, 19 pages.
Final Office Action for U.S. Appl. No. 13/013,986 mailed Oct. 19, 2012, 18 pages.

* cited by examiner

*Primary Examiner* — Lee Nguyen
(74) *Attorney, Agent, or Firm* — Withrow & Terranova, P.L.L.C.

(57) ABSTRACT

The present disclosure relates to an RF power amplifier (PA) power supply that includes a series pass circuit coupled across a direct current (DC)-to-DC converter to receive a power supply input signal, such as provided from a battery, to provide a power supply output signal to at least a first RF PA based on an output setpoint. Control circuitry selects between a switching supply operating mode and a non-switching supply operating mode based on the output setpoint. During the switching supply operating mode, the DC-to-DC converter provides the power supply output signal and during the non-switching supply operating mode, the series pass circuit provides the power supply output signal.

25 Claims, 25 Drawing Sheets

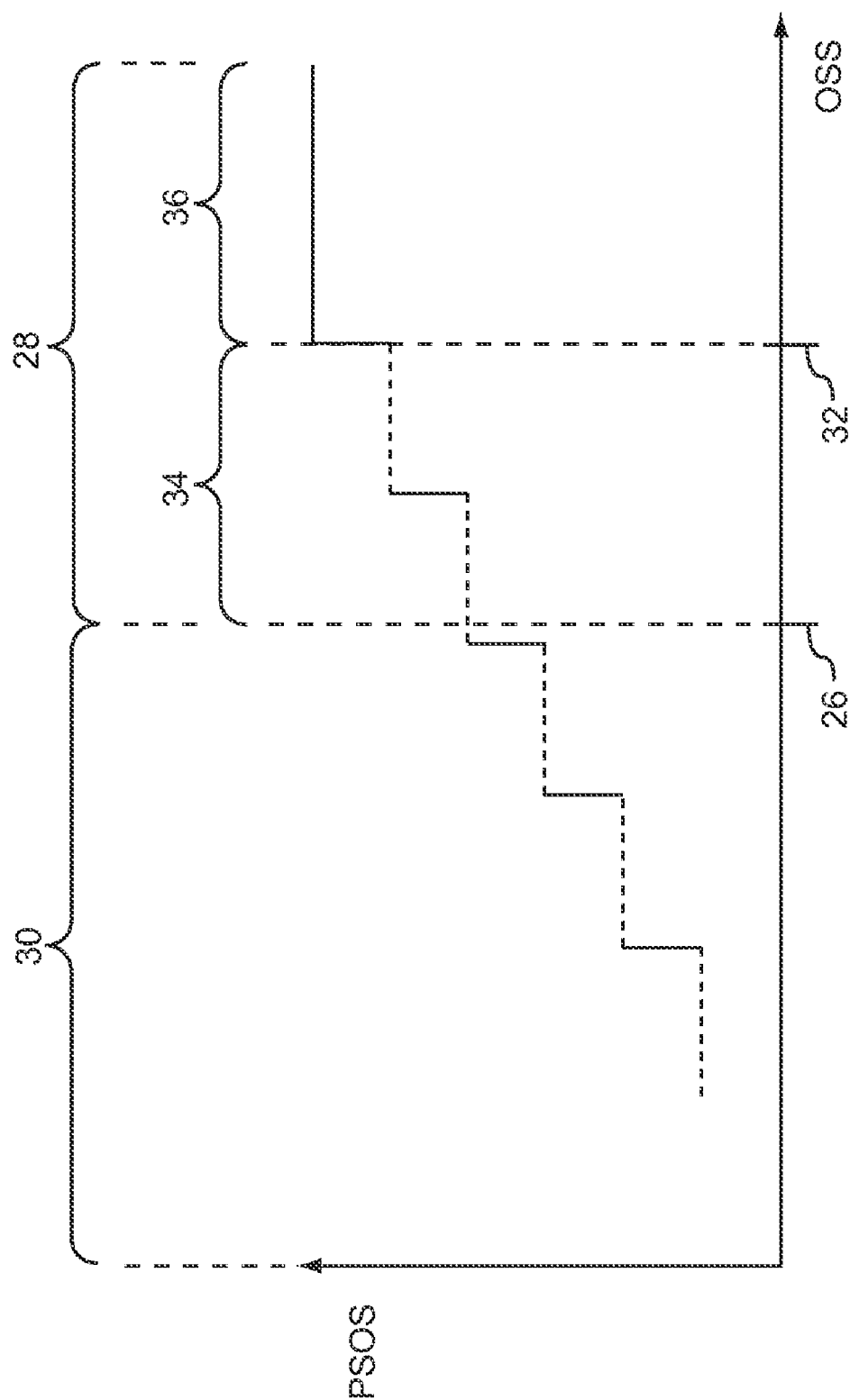

HIGH-EFFICIENCY LOW-COST POWER SUPPLY FOR RADIO FREQUENCY SYSTEMS

This application claims the benefit of provisional patent application Ser. No. 61/152,540, filed Feb. 13, 2009, and the benefit of provisional patent application Ser. No. 61/242,494, filed Sep. 15, 2009, the disclosures of which are hereby incorporated herein by reference in their entireties.

FIELD OF THE DISCLOSURE

Embodiments of the present disclosure relate to high efficiency power supplies, which may be used in radio frequency (RF) communications systems.

BACKGROUND OF THE DISCLOSURE

As wireless technology evolves, the number and variations of wireless communications protocols increase and may encompass multiple operating modes, including half-duplex modes and full duplex modes, multiple frequency bands, and various transmit power levels. As a result, wireless communications products may need to provide support for many such protocols. Therefore, RF architectures of wireless products may be complex. Further, portable wireless products may be battery powered. As such, power consumption in portable wireless products may need to be as low as possible to maximize battery life. Therefore, portable wireless products that provide support for many wireless communications protocols may need to have low power consumption, regardless of which wireless communications protocol is being used. A significant portion of the power used in a portable wireless product may be consumed by its power supply. To minimize overall power consumption, an efficiency of the power supply needs to be as high as possible. Thus, there is a need for a power supply that is capable of providing power in a portable wireless product, and operates efficiently regardless of operating mode, frequency band, or transmit power level.

SUMMARY OF THE EMBODIMENTS

The present disclosure relates to an RF power amplifier (PA) power supply that includes a series pass circuit coupled across a direct current (DC)-to-DC converter to receive a power supply input signal, such as provided from a battery, to provide a power supply output signal to at least a first RF PA based on an output setpoint. Control circuitry selects between a switching supply operating mode and a non-switching supply operating mode based on the output setpoint. During the switching supply operating mode, the DC-to-DC converter provides the power supply output signal and during the non-switching supply operating mode, the series pass circuit provides the power supply output signal.

The series pass circuit includes a series pass device, such that during the non-switching supply operating mode, a current of the power supply input signal is about equal to a current of the power supply output signal. As a result, a voltage drop between the power supply input signal and the power supply output signal causes power loss in the series pass circuit that is about proportional to a magnitude of the voltage drop. Therefore, as the magnitude of the voltage drop increases, the power loss increases, thereby decreasing efficiency of the RF PA power supply. However, during the switching supply operating mode, the DC-to-DC converter may provide relatively efficient conversion from the power supply input signal to the power supply output signal, particularly with a large voltage drop between the power supply input signal and the power supply output signal. A large voltage drop between the power supply input signal and the power supply output signal occurs when a voltage of the power supply output signal is small, which occurs when a power level being supplied to the first RF PA by the RF PA power supply is relatively low. Therefore, to keep size and cost of the DC-to-DC converter down, at relatively high power levels, the RF PA power supply operates in the non-switching supply operating mode, and to preserve efficiency, at relatively low power levels, the RF PA power supply operates in the non-switching supply operating mode.

By combining a series pass circuit and a DC-to-DC converter into a single RF PA power supply and having flexibility in switching between when to use the series pass circuit versus the DC-to-DC converter, the RF PA power supply may be used effectively in a multi-mode multi-band wireless communications device.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 21 is a graph illustrating the relationship between the output setpoint signal and the power supply output signal associated with the RF communications circuitry illustrated in FIG. 2 according to one embodiment of the output setpoint signal.

DETAILED DESCRIPTION OF THE PREFERRED EMBODIMENTS

The embodiments set forth below represent the necessary information to enable those skilled in the art to practice the disclosure and illustrate the best mode of practicing the disclosure. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure relates to an RF power amplifier (PA) power supply that includes a series pass circuit coupled across a direct current (DC)-to-DC converter to receive a power supply input signal, such as provided from a battery, to provide a power supply output signal to at least a first RF PA based on an output setpoint. Control circuitry selects between a switching supply operating mode and a non-switching supply operating mode based on the output setpoint. During the switching supply operating mode, the DC-to-DC converter provides the power supply output signal and during the non-switching supply operating mode, the series pass circuit provides the power supply output signal.

The series pass circuit includes a series pass device, such that during the non-switching supply operating mode, a current of the power supply input signal is about equal to a current of the power supply output signal. As a result, a voltage drop between the power supply input signal and the power supply output signal causes power loss in the series pass circuit that is about proportional to a magnitude of the voltage drop. Therefore, as the magnitude of the voltage drop increases, the power loss increases, thereby decreasing efficiency of the RF PA power supply. However, during the switching supply operating mode, the DC-to-DC converter may provide relatively efficient conversion from the power supply input signal to the power supply output signal, particularly with a large voltage drop between the power supply input signal and the power supply output signal. A large voltage drop between the power supply input signal and the power supply output signal occurs when a voltage of the power supply output signal is small, which occurs when a power level being supplied to the first RF PA by the RF PA power supply is relatively low. Therefore, to keep size and cost of the DC-to-DC converter down, at relatively high power levels, the RF PA power supply operates in the non-switching supply operating mode, and to preserve efficiency, at relatively low power levels, the RF PA power supply operates in the non-switching supply operating mode.

Figure 1:
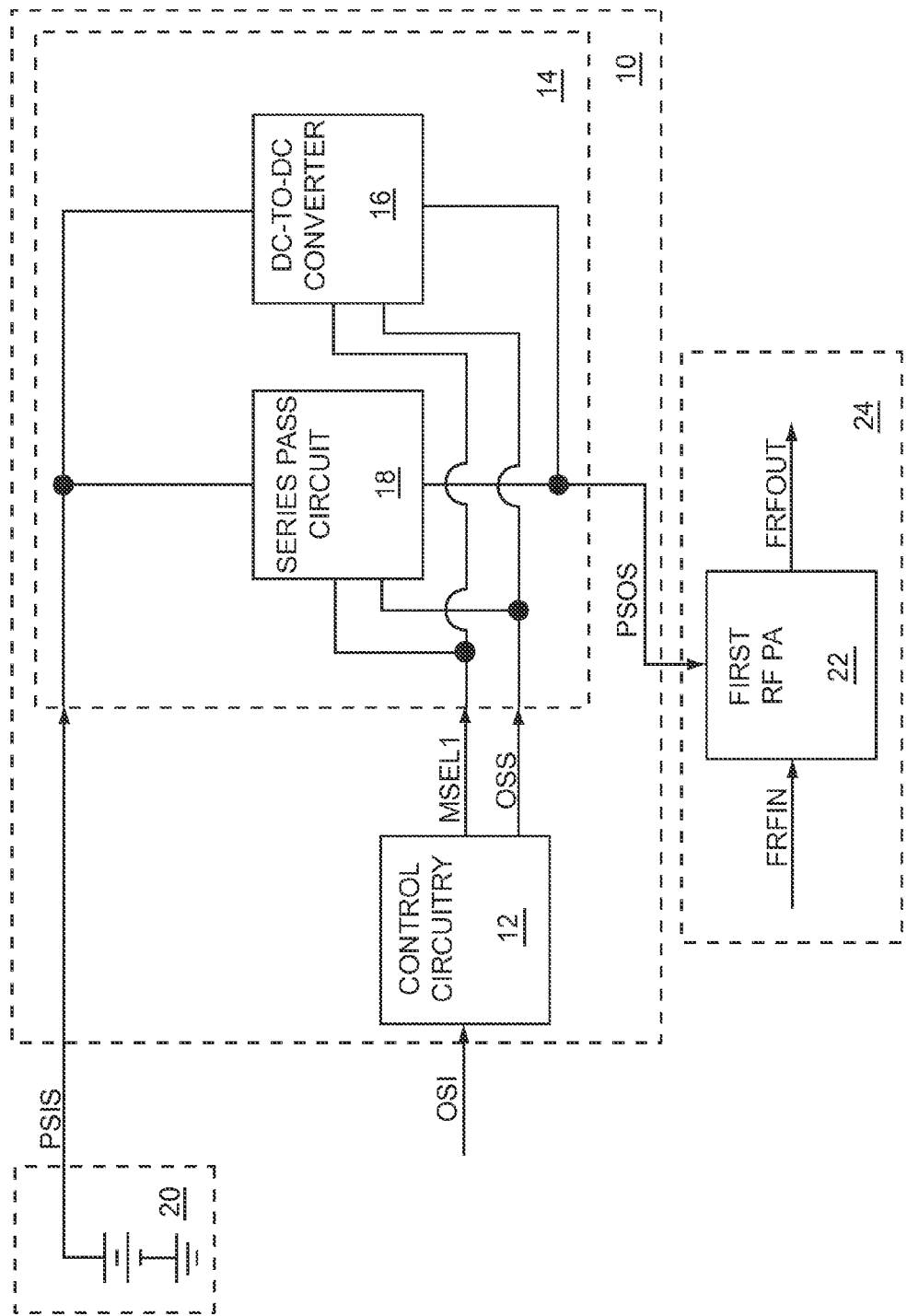
FIG. 1 shows RF communications circuitry according to one embodiment of the RF communications circuitry.

FIG. 1 shows RF communications circuitry 10 according to one embodiment of the RF communications circuitry 10. The RF communications circuitry 10 includes control circuitry 12 and an RF PA power supply 14, which includes a DC-to-DC converter 16 and a series pass circuit 18 coupled across the DC-to-DC converter 16. The series pass circuit 18 and the DC-to-DC converter 16 receive a power supply input signal PSIS from a DC power source 20. In one embodiment of the DC power source 20, the DC power source 20 includes a battery, which provides the power supply input signal PSIS. The control circuitry 12 selects between a switching supply operating mode and a non-switching supply operating mode based on an output setpoint. During the switching supply operating mode, the DC-to-DC converter 16 provides a power supply output signal PSOS to a first RF PA 22 based on the power supply input signal PSIS and the output setpoint. During the non-switching supply operating mode, the series pass circuit 18 provides the power supply output signal PSOS to the first RF PA 22 based on the power supply input signal PSIS. In some embodiments of the RF PA power supply 14, during the non-switching supply operating mode, the power supply output signal PSOS is also based on the output setpoint. In alternate embodiments of the RF PA power supply 14, during the non-switching supply operating mode, the power supply output signal PSOS is also based on the output setpoint only under certain conditions or not at all. The first RF PA 22 may be part of RF PA circuitry 24 and may receive and amplify a first RF input signal FRFIN to provide a first RF output signal FRFOUT.

The control circuitry 12 provides an output setpoint signal OSS based on the output setpoint and a first mode select signal MSEL1 based on which of the switching supply operating mode and the non-switching supply operating mode is selected to the DC-to-DC converter 16 and the series pass circuit 18. The output setpoint may be based on output setpoint information OSI, which is provided to the control circuitry 12 from system circuitry (not shown) that is external to the RF communications circuitry 10. In one embodiment of the RF PA power supply 14, the power supply input signal PSIS has an input voltage and the power supply output signal PSOS has an output voltage. Under certain conditions, the RF PA power supply 14 regulates the output voltage to follow the output setpoint. As a result, as the output setpoint decreases, the output voltage decreases and as the output setpoint increases, the output voltage increases.

In one embodiment of the DC-to-DC converter 16, the DC-to-DC converter 16 is a buck-only DC-to-DC converter, such that during the switching supply operating mode, the output voltage is less than the input voltage. In an alternate embodiment of the DC-to-DC converter 16, the DC-to-DC converter 16 is a buck-or-boost DC-to-DC converter, such that during the switching supply operating mode, the output voltage is less than the input voltage, is equal to the input voltage, or is greater than the input voltage.

Figure 2:
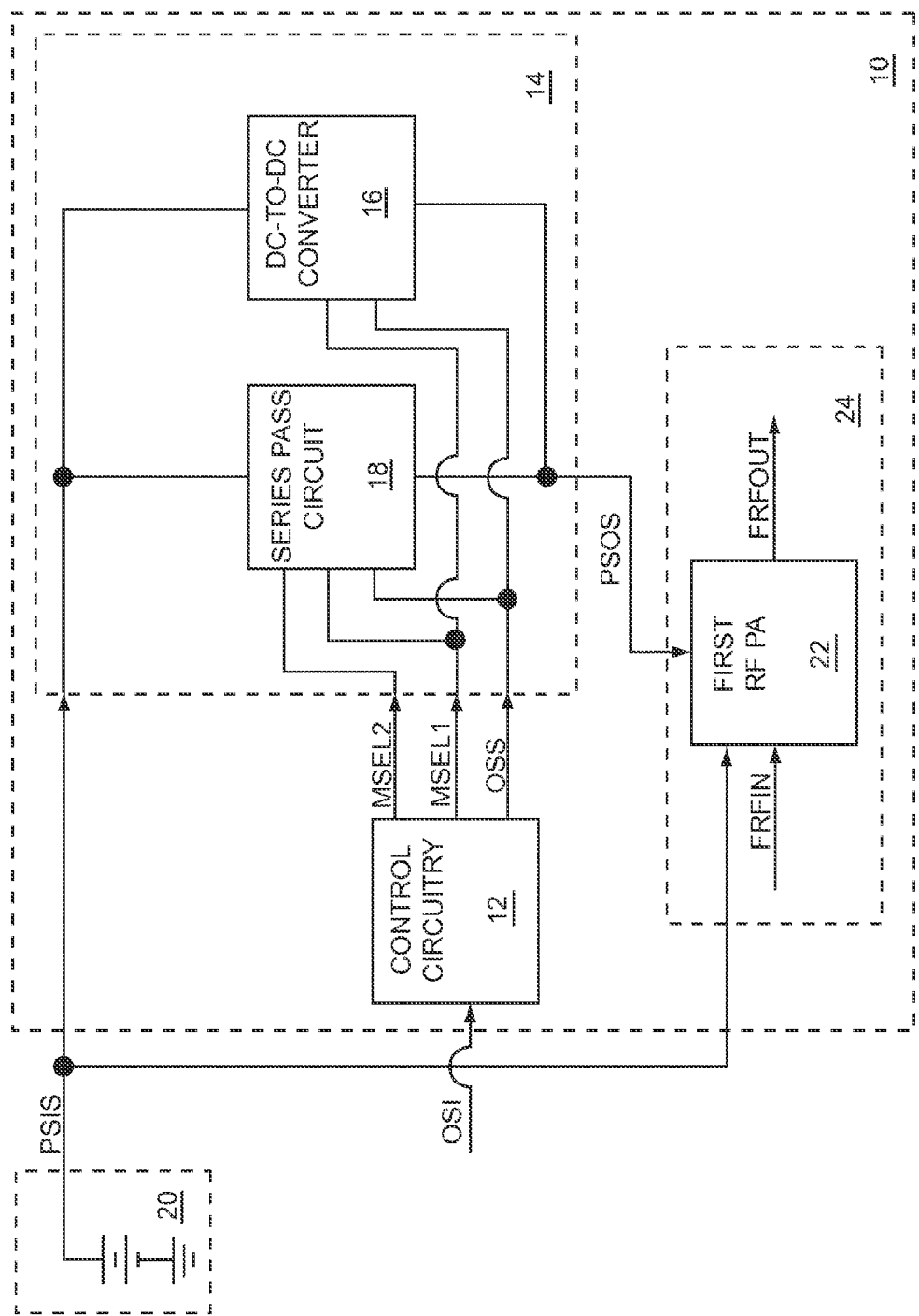
FIG. 2 shows the RF communications circuitry according to an alternate embodiment of the RF communications circuitry.

FIG. 2 shows the RF communications circuitry 10 according to an alternate embodiment of the RF communications circuitry 10. The RF communications circuitry 10 illustrated in FIG. 2 is similar to the RF communications circuitry 10 illustrated in FIG. 1, except the RF communications circuitry 10 illustrated in FIG. 2 further includes the RF PA circuitry 24 and during the non-switching supply operating mode, the control circuitry 12 further selects between a by-pass operating sub-mode and a regulating sub-mode based on the output setpoint. The control circuitry 12 further provides a second mode select signal MSEL2 based on which of the by-pass operating sub-mode and the regulating sub-mode is selected to the series pass circuit 18.

Figure 3:
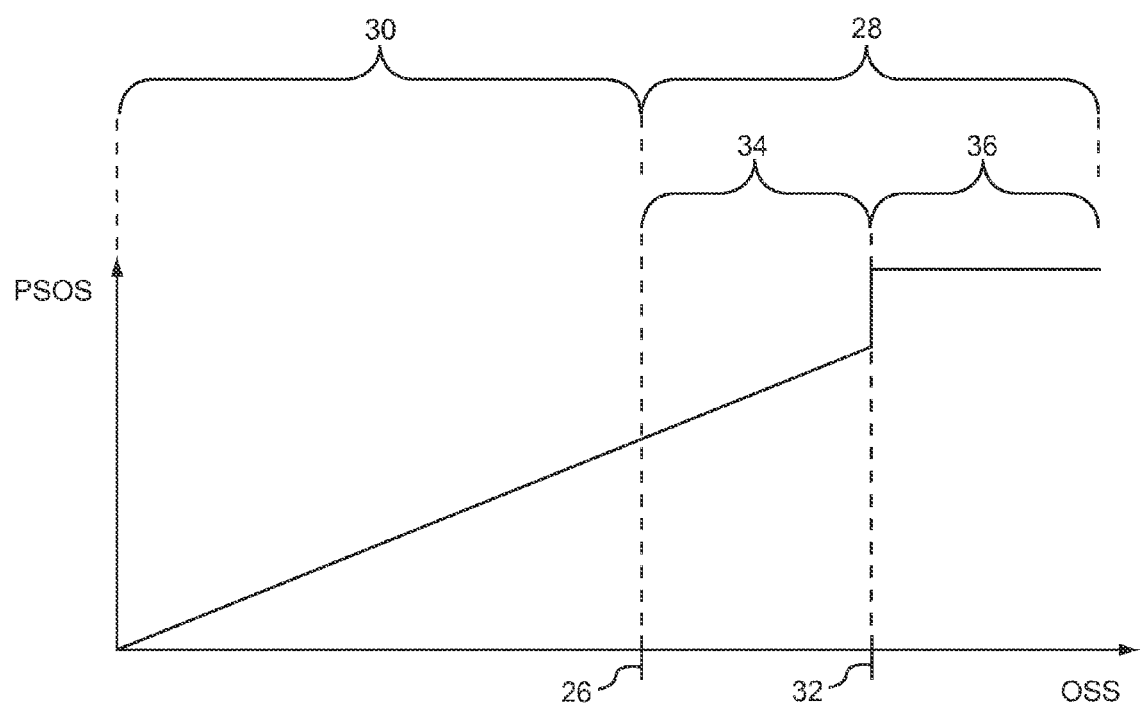
FIG. 3 is a graph illustrating the relationship between an output setpoint signal and a power supply output signal associated with the RF communications circuitry illustrated in FIG. 2.

FIG. 3 is a graph illustrating the relationship between the output setpoint signal OSS and the power supply output signal PSOS associated with the RF communications circuitry 10 illustrated in FIG. 2. Selection of the operating modes and sub-modes is based on the output setpoint, which may be represented by the output setpoint signal OSS. The output setpoint may have a first threshold 26, such that the control circuitry 12 selects the switching supply operating mode when the output setpoint is less than or equal to the first threshold 26 and selects the non-switching supply operating mode when the output setpoint is greater than the first threshold 26. Above the first threshold 26, the output setpoint signal OSS may have a non-switching supply operating region 28 and below the first threshold 26, the output setpoint signal OSS may have a switching supply operating region 30.

The output setpoint may further have a second threshold 32, such that the control circuitry 12 selects the regulating sub-mode when the output setpoint is less than or equal to the second threshold 32 and selects the by-pass operating sub-mode when the output setpoint is greater than the second threshold 32. The second threshold 32 is greater than the first threshold 26. The non-switching supply operating region 28 may have a linear operating sub-region 34 and a bypass operating sub-region 36, such that above the second threshold 32, the output setpoint signal OSS may have the bypass operating sub-region 36 and below the second threshold 32, the output setpoint signal OSS may have the linear operating sub-region 34.

During the by-pass operating sub-mode, the series pass circuit 18 may include and configure a series pass element to an ON state, thereby minimizing a voltage drop between the power supply input signal PSIS and the power supply output signal PSOS. As a result, the voltage of the power supply output signal PSOS may tend to approximate and follow the voltage of the power supply input signal PSIS. During the by-pass operating sub-mode, the series pass circuit 18 may ignore the output setpoint signal OSS. In one embodiment of the RF communications circuitry 10, the output setpoint may be set to a fixed value, which during the regulating sub-mode or during the switching supply operating mode may provide the power supply output signal PSOS with a fixed value. In an alternate embodiment of the RF communications circuitry 10, the output setpoint may be modulated, which during the regulating sub-mode or during the switching supply operating mode may provide the power supply output signal PSOS with modulation.

The first RF PA 22 may have multiple stages. If one or more of the stages of the first RF PA 22 have input signals that drive a stage of the first RF PA 22 into saturation, then a magnitude of RF output power from the first RF PA 22 may be based on a magnitude of the power supply output signal PSOS. This may occur during the regulating sub-mode or during the switching supply operating mode and when the power supply output signal PSOS is modulated. Therefore, in one embodiment of the RF communications circuitry 10, during the regulating sub-mode or during the switching supply operating mode, the output setpoint is based on a desired RF output power from the first RF PA 22 and during the regulating sub-mode or during the switching supply operating mode, a magnitude of the RF output power from the first RF PA 22 is based on a magnitude of the power supply output signal PSOS.

Figure 4:
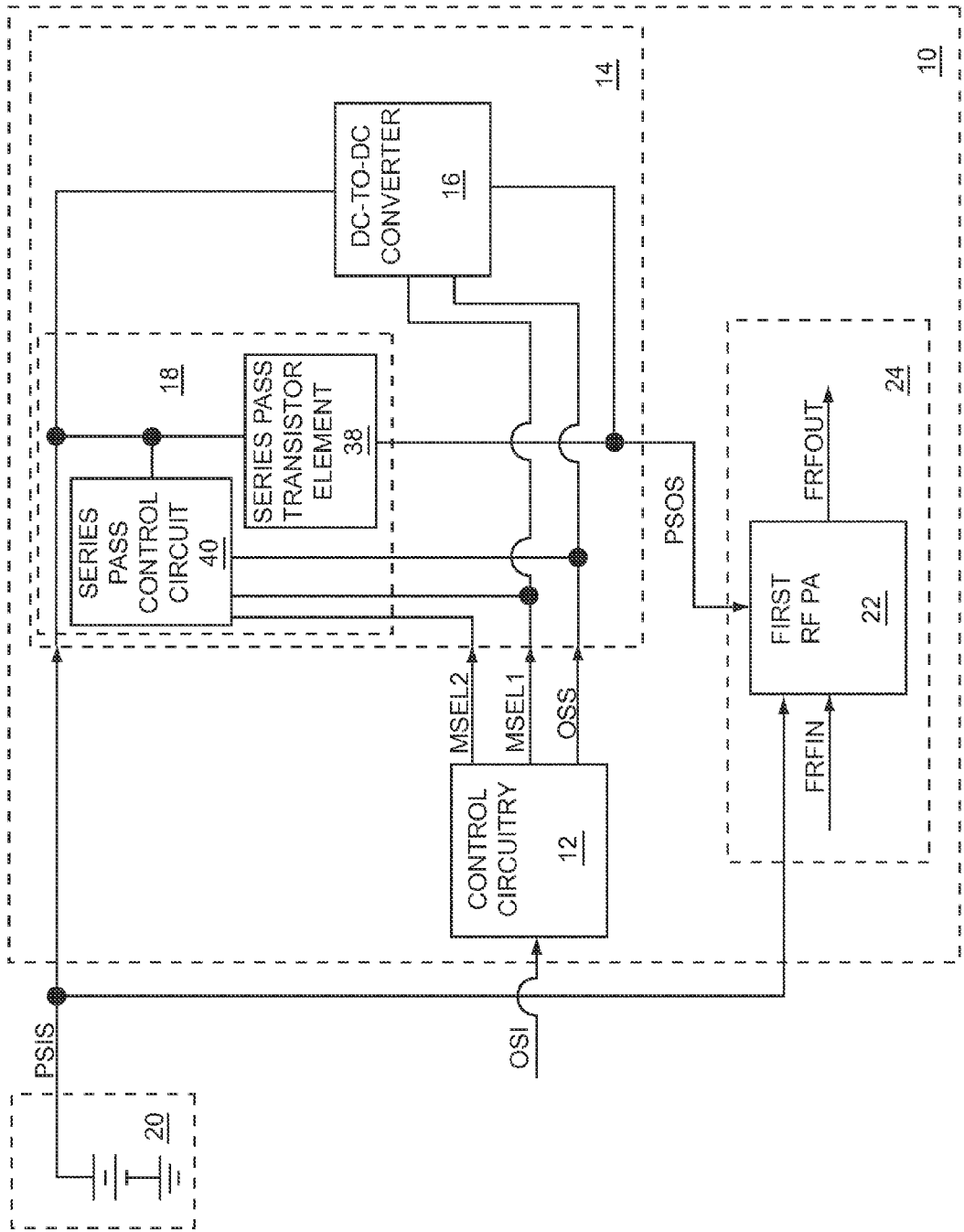
FIG. 4 shows details of a series pass circuit illustrated in FIG. 2 according to one embodiment of the series pass circuit.

FIG. 4 shows details of the series pass circuit 18 illustrated in FIG. 2 according to one embodiment of the series pass circuit 18. The series pass circuit 18 includes a series pass transistor element 38 coupled across the DC-to-DC converter 16 and a series pass control circuit 40. The series pass control circuit 40 receives the output setpoint signal OSS, the first mode select signal MSEL1, the second mode select signal MSEL2, and the power supply input signal PSIS, and controls the series pass transistor element 38 as appropriate. During the non-switching supply operating mode, the series pass control circuit 40 controls the series pass transistor element 38 to provide the power supply output signal PSOS to the first RF PA 22 based on the power supply input signal PSIS. During the regulating sub-mode, the series pass control circuit 40 controls the series pass transistor element 38 to provide the power supply output signal PSOS based on both the power supply input signal PSIS and the output setpoint. However, during the by-pass operating sub-mode, the series pass control circuit 40 controls the series pass transistor element 38 to operate in an ON state. As a result, the power supply output signal PSOS is based on the power supply input signal PSIS regardless of the output setpoint signal OSS. The power supply output signal PSOS may tend to follow the power supply input signal PSIS. Alternate embodiments of the RF communications circuitry 10 may not include the by-pass operating sub-mode and the regulating sub-mode. As such, the second mode select signal MSEL2 may be omitted in such embodiments.

Figure 5:
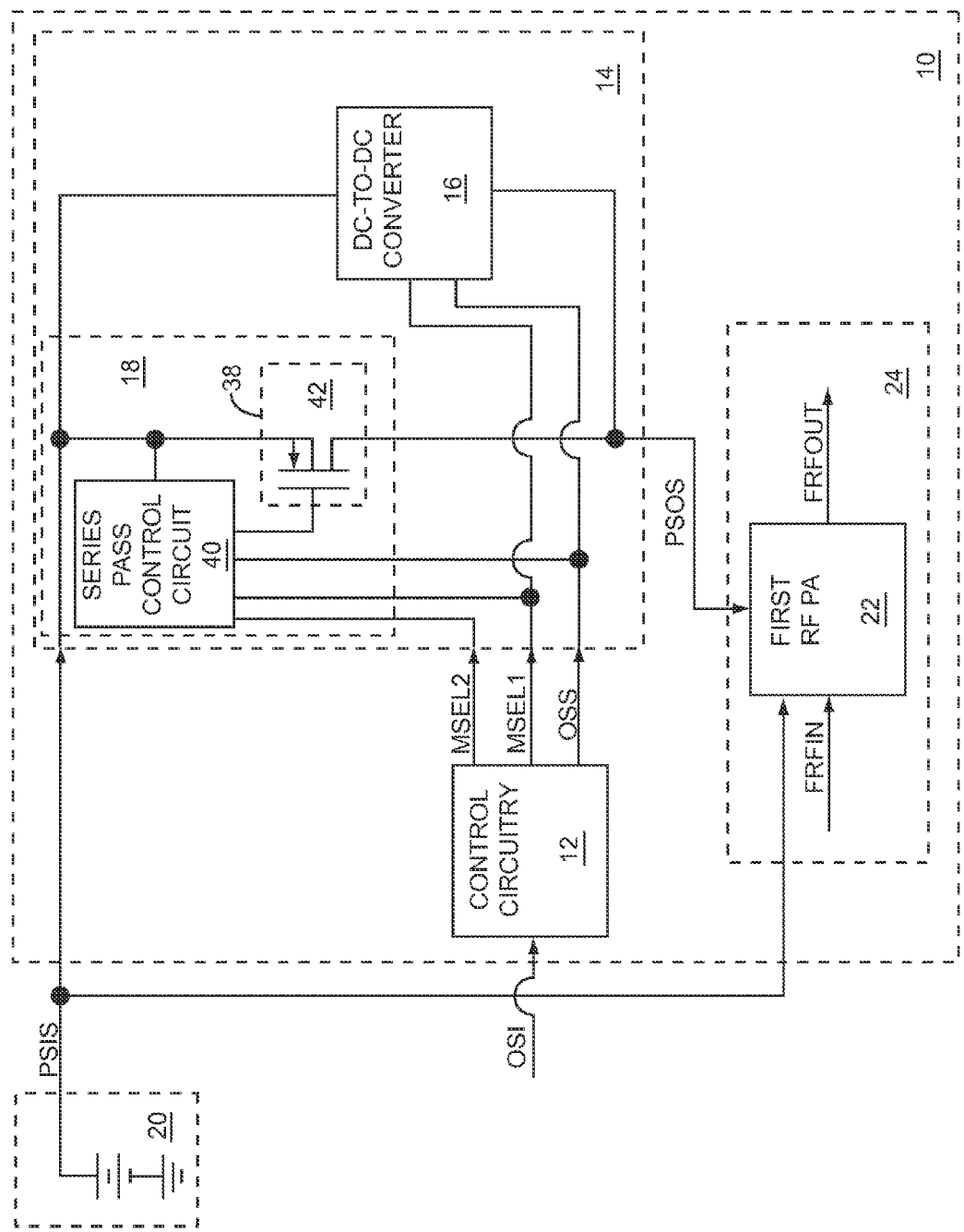
FIG. 5 shows details of a series pass transistor element illustrated in FIG. 4 according to one embodiment of the series pass transistor element.

FIG. 5 shows details of the series pass transistor element 38 illustrated in FIG. 4 according to one embodiment of the series pass transistor element 38. The series pass transistor element 38 includes a P-type metal oxide semiconductor (PMOS) transistor element 42 coupled across the DC-to-DC converter 16. A source of the PMOS transistor element 42 receives the power supply input signal PSIS, a drain of the PMOS transistor element 42 provides the power supply output signal PSOS during the non-switching operating mode, and a gate of the PMOS transistor element 42 is coupled to the series pass control circuit 40.

Figure 6:
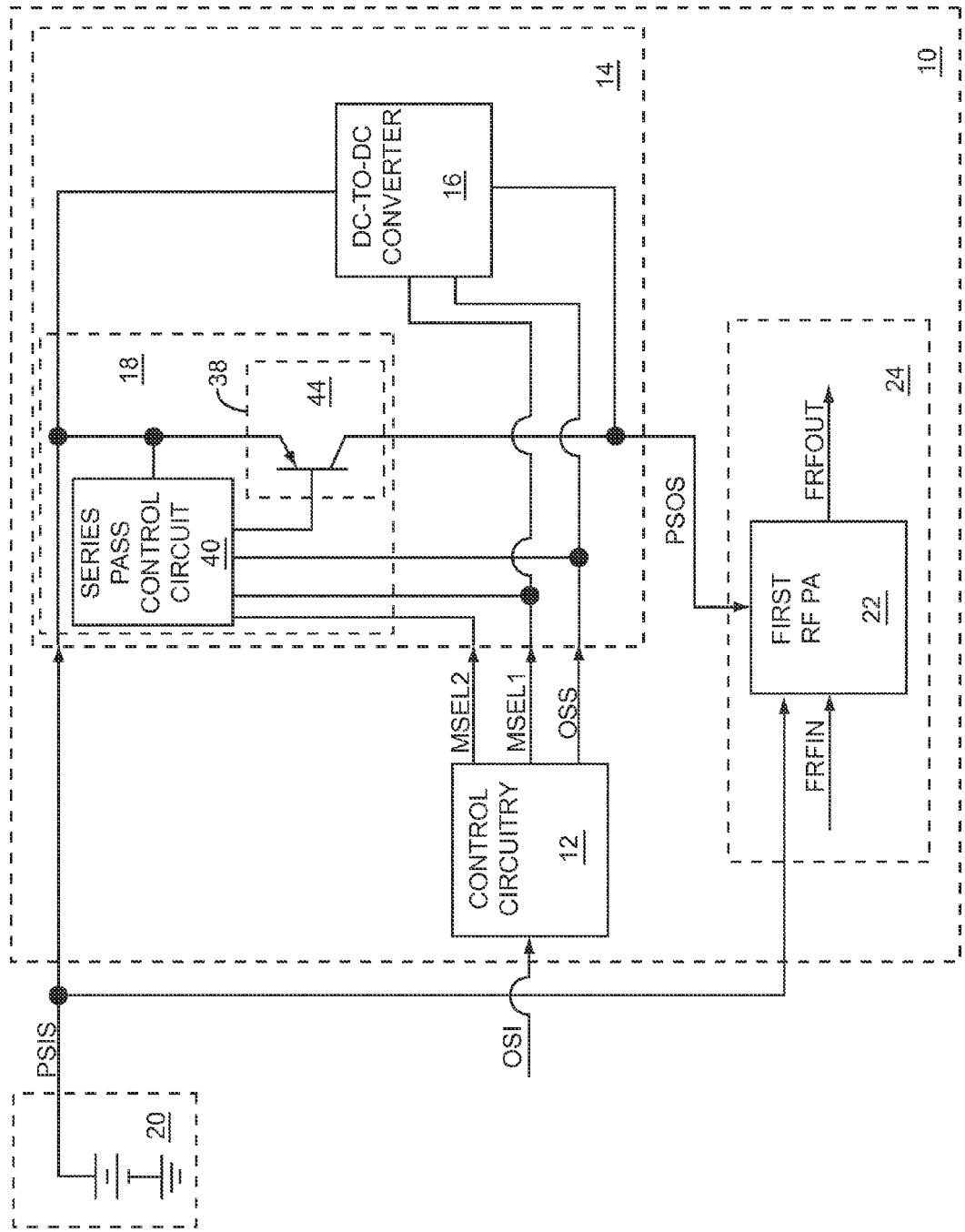
FIG. 6 shows details of the series pass transistor element illustrated in FIG. 4 according to an alternate embodiment of the series pass transistor element.

FIG. 6 shows details of the series pass transistor element 38 illustrated in FIG. 4 according to an alternate embodiment of the series pass transistor element 38. The series pass transistor element 38 includes a PNP transistor element 44 coupled across the DC-to-DC converter 16. An emitter of the PNP transistor element 44 receives the power supply input signal PSIS, a collector of the PNP transistor element 44 provides the power supply output signal PSOS during the non-switching operating mode, and a base of the PNP transistor element 44 is coupled to the series pass control circuit 40.

Figure 7:
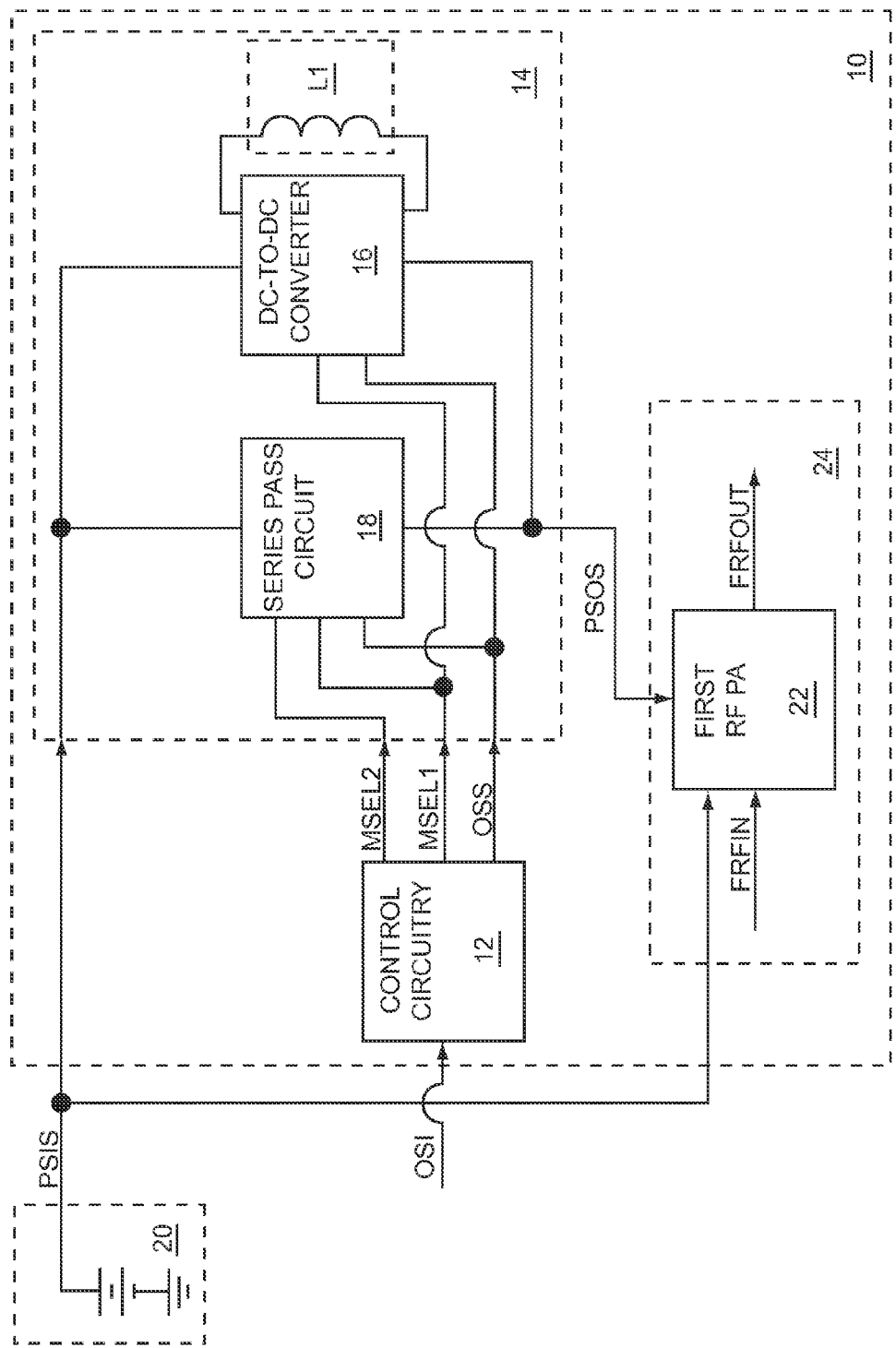
FIG. 7 shows details of an RF PA power supply illustrated in FIG. 2 according to an alternate embodiment of the RF PA power supply.

FIG. 7 shows details of the RF PA power supply 14 illustrated in FIG. 2 according to an alternate embodiment of the RF PA power supply 14. The RF PA power supply 14 includes at least a first inductive element L1, which is used as an energy transfer element to provide the power supply output signal PSOS during the switching supply operating mode. Specifically, the first inductive element L1 may receive energy using the power supply input signal PSIS and transfer energy to the power supply output signal PSOS. In other embodiments of the RF PA power supply 14, the first inductive element L1 may be provided by circuitry external to the RF PA power supply 14. The first inductive element L1 may be provided by bonding wires, by printed traces on a substrate, by surface mount devices, or any combination thereof. Certain inductor types may provide high-Q circuits, thereby providing high efficiency conversion solutions. However, use of inductive elements may result in increased size, cost, or both.

Figure 8:
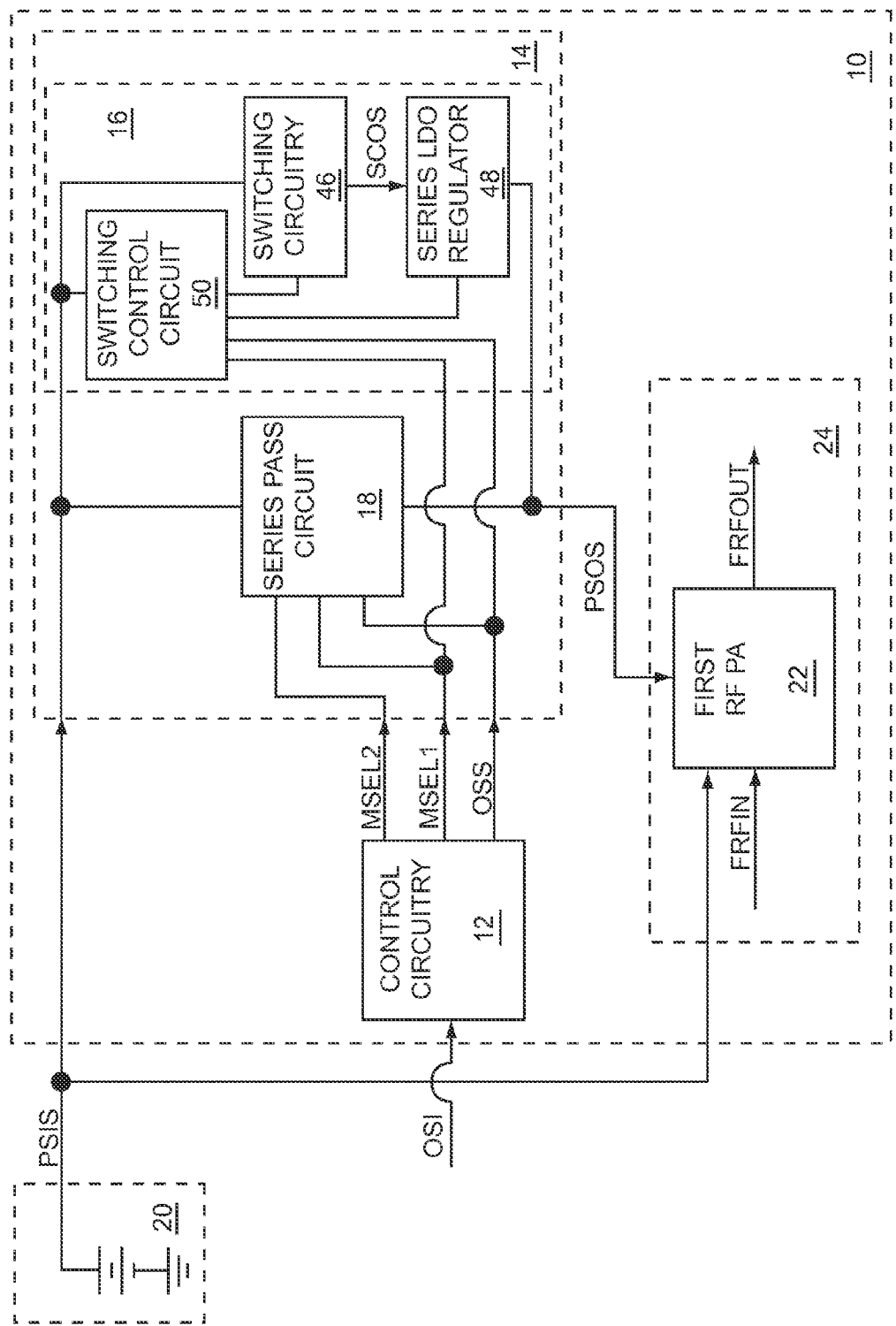
FIG. 8 shows details of a DC-to-DC converter illustrated in FIG. 2 according to one embodiment of the DC-to-DC converter.

FIG. 8 shows details of the DC-to-DC converter 16 illustrated in FIG. 2 according to one embodiment of the DC-to-DC converter 16. The DC-to-DC converter 16 includes switching circuitry 46, a series low drop-out (LDO) regulator 48, and a switching control circuit 50. During the switching supply operating mode, the switching circuitry 46 receives the power supply input signal PSIS and provides a switching circuitry output signal SCOS based on the power supply input signal PSIS and the output setpoint. During the switching supply operating mode, the series LDO regulator 48 receives the switching circuitry output signal SCOS and provides the power supply output signal PSOS based on the switching circuitry output signal SCOS and the output setpoint. The switching control circuit 50 receives the output setpoint signal OSS, the first mode select signal MSEL1, and the power supply input signal PSIS, and controls the switching circuitry 46 and the series LDO regulator 48 as appropriate.

The switching circuitry 46 may incorporate energy storage elements to provide the switching circuitry output signal SCOS in an efficient manner. The series LDO regulator 48 includes a series pass device to provide the power supply output signal PSOS using the switching circuitry output signal SCOS. Using the series pass device may provide accurate regulation of the power supply output signal PSOS. Such accurate regulation may be needed for certain wireless communications protocols. The switching control circuit 50 may control the switching circuitry 46 to keep a voltage difference between the switching circuitry output signal SCOS and the power supply output signal PSOS as low as possible to minimize power loss in the series LDO regulator 48. By combining the switching circuitry 46 with the series LDO regulator 48, the DC-to-DC converter 16 may operate efficiently while providing accurate regulation of the power supply output signal PSOS.

In a first embodiment of the DC-to-DC converter 16, at least the first inductive element L1 (not shown) is coupled to the switching circuitry 46, such that the first inductive element is used as an energy transfer element to provide the switching circuitry output signal SCOS during the switching supply operating mode. Specifically, the first inductive element L1 may receive energy using the power supply input signal PSIS and transfer energy to the switching circuitry output signal SCOS.

In a second embodiment of the DC-to-DC converter 16, the switching circuitry 46 includes multiple capacitive elements (not shown), which are used as energy transfer elements to provide the switching circuitry output signal SCOS during the switching supply operating mode. Specifically, the capacitive elements may receive energy using the power supply input signal PSIS and transfer energy to the switching circuitry output signal SCOS. In an exemplary embodiment of the DC-to-DC converter 16, two capacitive elements (not shown) are used as energy transfer elements to provide the switching circuitry output signal SCOS during the switching supply operating mode.

Using inductive elements as energy transfer elements may have the benefit of providing good regulation of the switching circuitry output signal SCOS, which may minimize the voltage drop between the switching circuitry output signal SCOS and the power supply output signal PSOS, thereby maximizing efficiency. However, inductive elements may increase size, cost, or both of the RF communications circuitry 10. Conversely, using capacitive elements as energy transfer elements may have the benefit of low cost and small size. However, using capacitive elements may restrict the switching circuitry 46 to providing discrete magnitude steps of the switching circuitry output signal SCOS. As a result, the switching control circuit 50 may have multiple discrete output setpoints associated with the discrete magnitude steps of the switching circuitry output signal SCOS, such that during the switching supply operating mode, the switching control circuit 50 selects one of the multiple discrete output setpoints based on the power supply input signal PSIS and the output setpoint, and controls the switching circuitry 46 to provide the magnitude of the switching circuitry output signal SCOS that correlates with the selected discrete output setpoint.

In one embodiment of the RF PA power supply 14, during the switching supply operating mode, the series pass circuit 18 is used to assist the DC-to-DC converter 16. During the switching supply operating mode, the series pass circuit 18 may contribute to the power supply output signal PSOS to smooth transitions when selecting between one of the multiple discrete output setpoints and another of the multiple discrete output setpoints. Alternatively or additionally, during the switching supply operating mode, the series pass circuit 18 may contribute to the power supply output signal PSOS to assist the DC-to-DC converter 16 in regulating the power supply output signal PSOS. Conceptually, the DC-to-DC converter 16 may provide high efficiency for transferring a significant portion of required energy between the power supply input signal PSIS and the power supply output signal PSOS, and the series pass circuit 18 may provide accurate regulation of the power supply output signal PSOS by transferring a remaining portion of the required energy between the power supply input signal PSIS and the power supply output signal PSOS.

Figure 9:
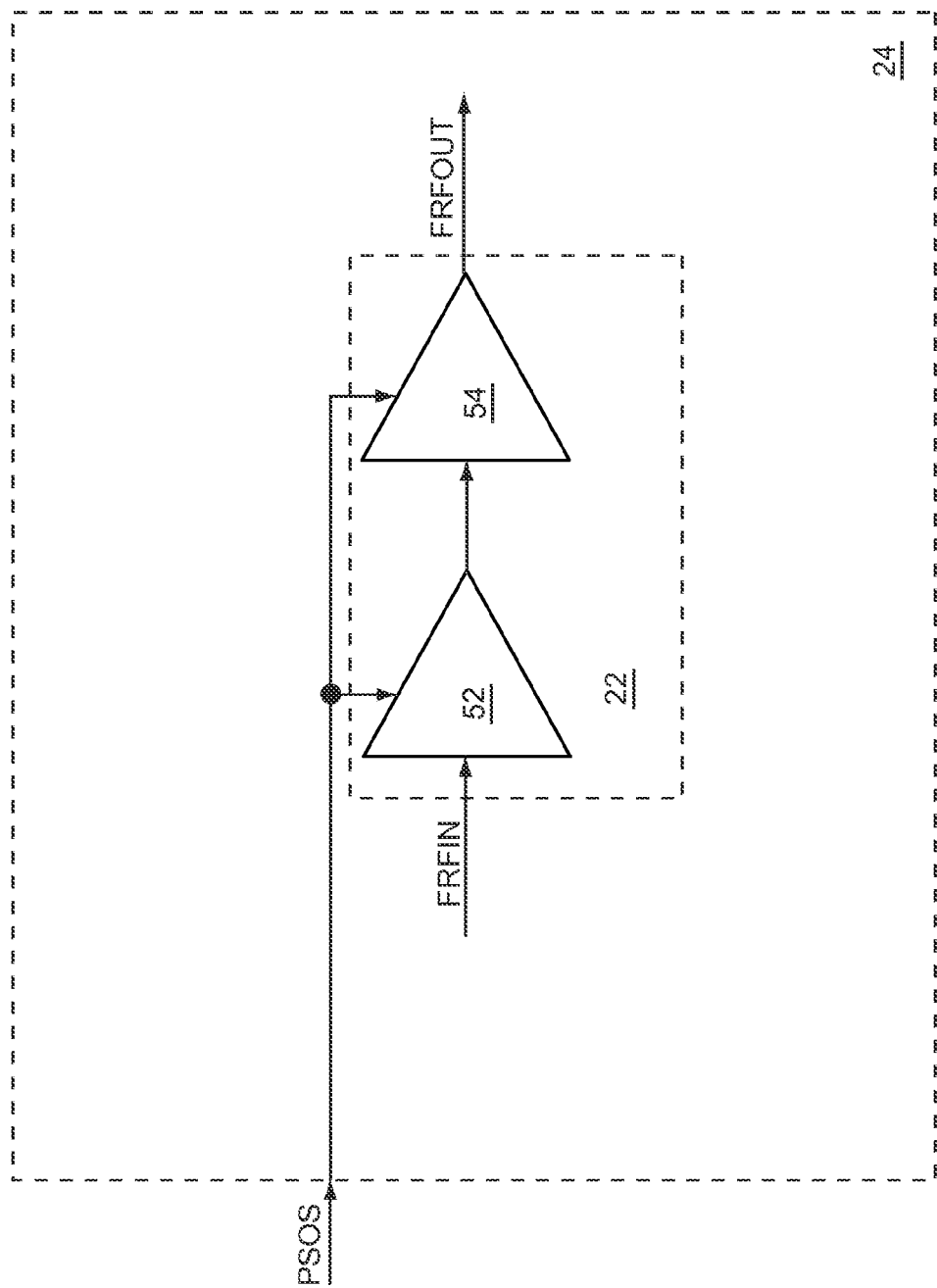
FIG. 9 shows details of RF PA circuitry illustrated in FIG. 1 according to one embodiment of the RF PA circuitry.

FIG. 9 shows details of the RF PA circuitry 24 illustrated in FIG. 1 according to one embodiment of the RF PA circuitry 24. The first RF PA 22 includes a first driver stage 52 and a first final stage 54. The first driver stage 52 receives and amplifies the first RF input signal FRFIN to feed an input signal to the first final stage 54, which receives and amplifies the input signal to provide the first RF output signal FRFOUT. Both the first driver stage 52 and the first final stage 54 receive the power supply output signal PSOS. The power supply output signal PSOS may provide power to amplifying circuit elements in the first driver stage 52, to amplifying circuit elements in the first final stage 54, or both.

Figure 10:
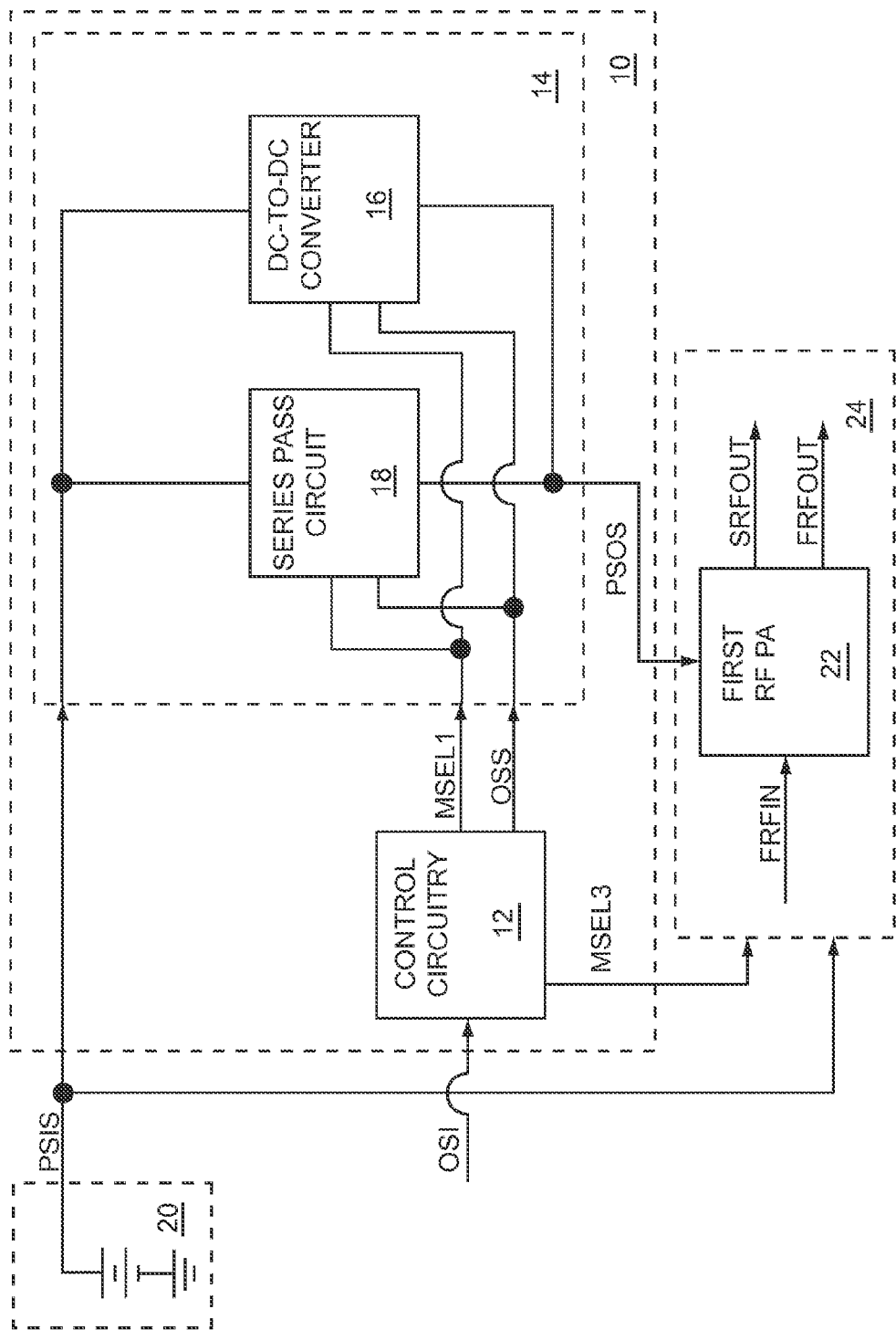
FIG. 10 shows details of the RF communications circuitry and the RF PA circuitry illustrated in FIG. 1 according to alternate embodiments of the RF communications circuitry and the RF PA circuitry.

FIG. 10 shows details of the RF communications circuitry 10 and the RF PA circuitry 24 illustrated in FIG. 1 according to alternate embodiments of the RF communications circuitry 10 and the RF PA circuitry 24. The RF communications circuitry 10 and the RF PA circuitry 24 illustrated in FIG. 10 may be part of a multi-mode RF communications system and are similar to the RF communications circuitry 10 and the RF PA circuitry 24 illustrated in FIG. 1, except the control circuitry 12 illustrated in FIG. 10 further provides a third mode select signal MSEL3 to the RF PA circuitry 24, the RF PA circuitry 24 further receives the power supply input signal PSIS, and the first RF PA 22 further provides a second RF output signal SRFOUT. The control circuitry 12 selects between a half duplex operating mode and a full duplex operating mode and provides the third mode select signal MSEL3, which is based on which of the half duplex operating mode and the full duplex operating mode switching supply operating mode is selected. The first RF output signal FRFOUT may be a full duplex RF output signal and the second RF output signal SRFOUT may be a half duplex RF output signal. As such, during the full duplex operating mode, the first RF PA 22 may may receive and amplify the first RF input signal FRFIN to provide the first RF output signal FRFOUT. Alternatively, during the half duplex operating mode, the first RF PA 22 may receive and amplify the first RF input signal FRFIN to provide the second RF output signal SRFOUT.

Figure 11:
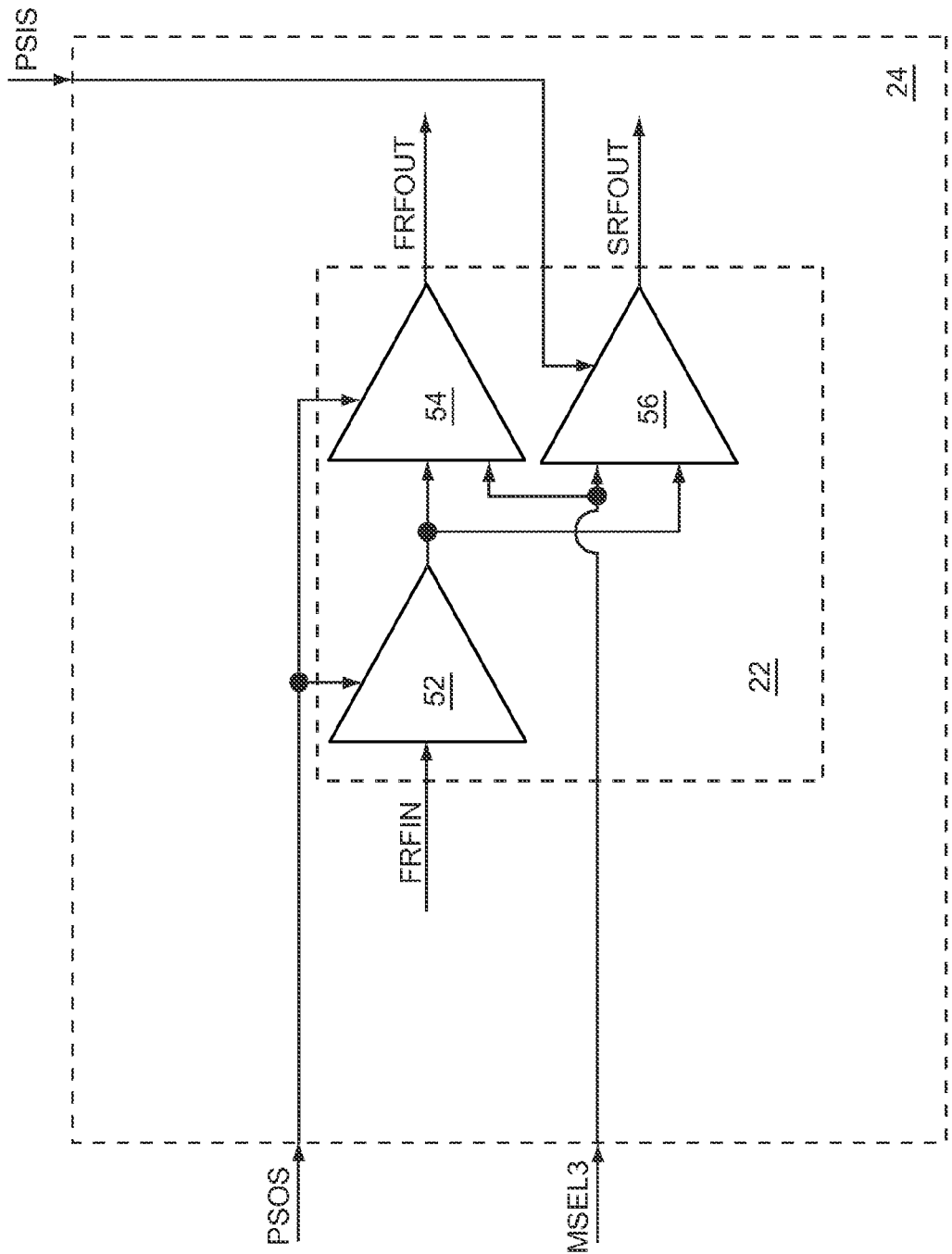
FIG. 11 shows details of a first RF PA illustrated in FIG. 10 according to one embodiment of the first RF PA.

FIG. 11 shows details of the first RF PA 22 illustrated in FIG. 10 according to one embodiment of the first RF PA 22.

The first RF PA 22 includes the first driver stage 52, the first final stage 54, and a second final stage 56. During the full duplex operating mode, the first driver stage 52 receives and amplifies the first RF input signal FRFIN to feed an input signal to the first final stage 54, which receives and amplifies the input signal to provide the first RF output signal FRFOUT. Both the first driver stage 52 and the first final stage 54 receive the power supply output signal PSOS. The power supply output signal PSOS may provide power to amplifying circuit elements in the first driver stage 52, to amplifying circuit elements in the first final stage 54, or both. During the full duplex operating mode, the second final stage 56 is inactive.

During the half duplex operating mode, the first driver stage 52 receives and amplifies the first RF input signal FRFIN to feed an input signal to the second final stage 56, which receives and amplifies the input signal to provide the second RF output signal SRFOUT. The first driver stage 52 receives the power supply output signal PSOS, which may provide power to amplifying circuit elements in the first driver stage 52. The second final stage 55 receives the power supply input signal PSIS, which may provide power to amplifying circuit elements in the second final stage 56. During the half duplex operating mode, the first final stage 54 is inactive.

Using different final stages 54, 56 during the half duplex operating mode versus the full duplex operating mode combined with the RF PA power supply 14 may provide good performance during each of the operating modes. Half duplex operation may be associated with a number of second generation communication protocols. When using such protocols, efficiency of the multi-mode RF communications system may be most important at high RF output power levels. By powering the second final stage 56 directly from the power supply input signal PSIS, efficiency of the multi-mode RF communications system may be highest at high RF output power levels, particularly since there are no series elements between the second final stage 56 and the power supply input signal PSIS. Conversely, full duplex operation may be associated with a number of third generation communication protocols. When using such protocols, efficiency of the multi-mode RF communications system may be most important at reduced RF output power levels, since such systems may operate at such power levels for long periods of time. By powering the first final stage 54 from the power supply output signal PSOS, reduced RF output power levels may correlate with operating the RF PA power supply 14 in the switching supply operating mode, thereby providing high efficiency. Further, by using different final stages 54, 56, the load line of each of the final stages 54, 56 may be optimized for its intended application. Additionally, by optimizing the load line of the first driver stage 52 for full duplex operation, efficiency may be optimized for full duplex operation. However, during half duplex operation, since the power source for the first driver stage 52 is different than the power source for the second final stage 56, the RF PA power supply 14 is not encumbered by the second final stage 56 and may be directed toward efficient operation of the first driver stage 52.

Since the first final stage 54 may be associated with only full duplex operation, the first final stage 54 may be coupled to a first duplexer. Similarly, since the second final stage 56 may be associated with only half duplex operation, the second final stage 56 may be coupled to a transmit/receive switch.

Figure 12:
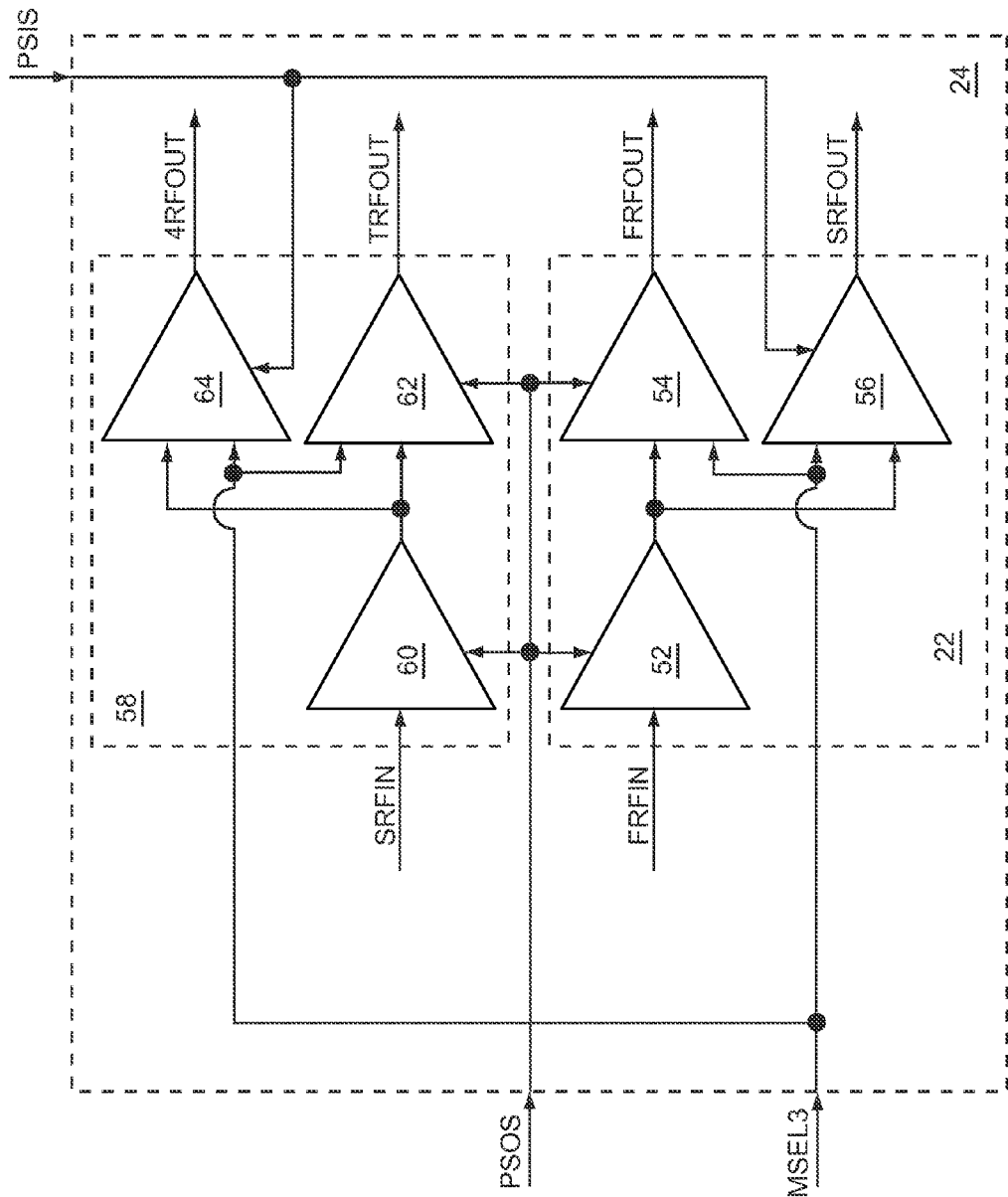
FIG. 12 shows details of the RF PA circuitry illustrated in FIG. 10 according to an additional embodiment of the RF PA circuitry.

FIG. 12 shows details of the RF PA circuitry 24 illustrated in FIG. 10 according to an additional embodiment of the RF PA circuitry 24. The RF PA circuitry 24 may be part of a multi-band multi-mode RF communications system. The RF PA circuitry 24 illustrated in FIG. 12 is similar to the RF PA circuitry 24 illustrated in FIG. 11, except the RF PA circuitry 24 illustrated in FIG. 12 further includes a second RF PA 58. Instead of selecting between a half duplex operating mode and a full duplex operating mode, the control circuitry 12 selects one of a high band half duplex operating mode, a high band full duplex operating mode, a low band half duplex operating mode, and a low band full duplex operating mode. Further the control circuitry 12 provides the third mode select signal MSEL3, which is based on which of the high band half duplex operating mode, a high band full duplex operating mode, a low band half duplex operating mode, and a low band full duplex operating mode is selected. The second RF PA 58 includes a second driver stage 60, a third final stage 62, and a fourth final stage 64.

During the high band full duplex operating mode, the first driver stage 52 receives and amplifies the first RF input signal FRFIN to feed an input signal to the first final stage 54, which receives and amplifies the input signal to provide the first RF output signal FRFOUT. Both the first driver stage 52 and the first final stage 54 receive the power supply output signal PSOS. The power supply output signal PSOS may provide power to amplifying circuit elements in the first driver stage 52, to amplifying circuit elements in the first final stage 54, or both. During the high band full duplex operating mode, the second final stage 56, the third final stage 62, and the fourth final stage 64 are all inactive.

During the high band half duplex operating mode, the first driver stage 52 receives and amplifies the first RF input signal FRFIN to feed an input signal to the second final stage 56, which receives and amplifies the input signal to provide the second RF output signal SRFOUT. The first driver stage 52 receives the power supply output signal PSOS, which may provide power to amplifying circuit elements in the first driver stage 52. The second final stage 55 receives the power supply input signal PSIS, which may provide power to amplifying circuit elements in the second final stage 56. During the high band half duplex operating mode, the first final stage 54, the third final stage 62, and the fourth final stage 64 are all inactive.

During the low band full duplex operating mode, the second driver stage 60 receives and amplifies a second RF input signal SRFIN to feed an input signal to the third final stage 62, which receives and amplifies the input signal to provide a third RF output signal TRFOUT. Both the second driver stage 60 and the third final stage 62 receive the power supply output signal PSOS. The power supply output signal PSOS may provide power to amplifying circuit elements in the second driver stage 60, to amplifying circuit elements in the third final stage 62, or both. During the low band full duplex operating mode, first final stage 54, the second final stage 56, and the fourth final stage 64 are all inactive.

During the low band half duplex operating mode, the second driver stage 60 receives and amplifies the second RF input signal SRFIN to feed an input signal to the fourth final stage 64, which receives and amplifies the input signal to provide a fourth RF output signal 4RFOUT. The second driver stage 60 receives the power supply output signal PSOS, which may provide power to amplifying circuit elements in the second driver stage 60. The fourth final stage 64 receives the power supply input signal PSIS, which may provide power to amplifying circuit elements in the fourth final stage 64. During the low band half duplex operating mode, the first final stage 54, the second final stage 56, and the third final stage 62 are all inactive.

Figure 13:
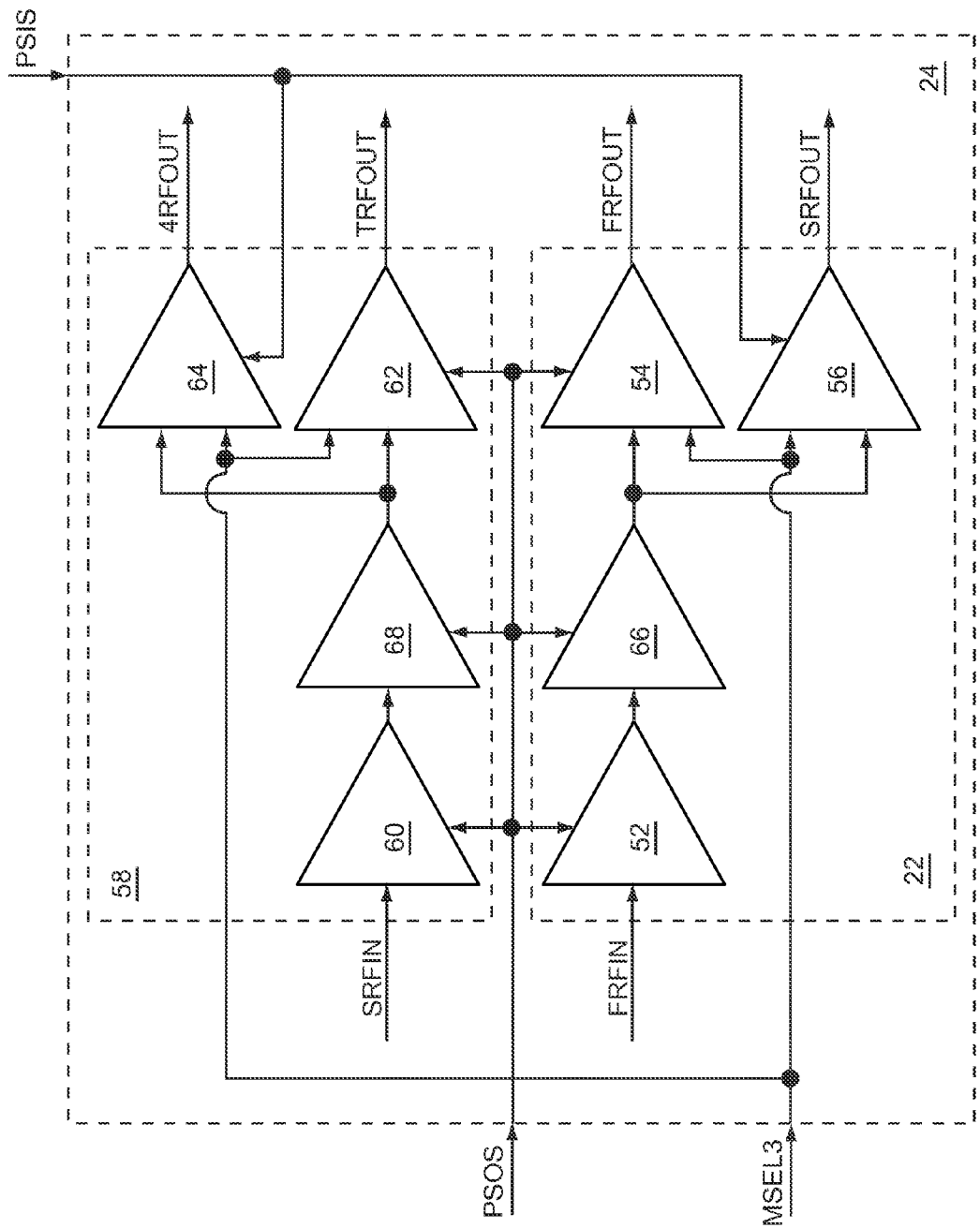
FIG. 13 shows details of the RF PA circuitry illustrated in FIG. 10 according to another embodiment of the RF PA circuitry.

FIG. 13 shows details of the RF PA circuitry 24 illustrated in FIG. 10 according to another embodiment of the RF PA circuitry 24. The RF PA circuitry 24 illustrated in FIG. 13 is similar to the RF PA circuitry 24 illustrated in FIG. 12, except in the RF PA circuitry 24 illustrated in FIG. 13, the first RF PA 22 further includes a third driver stage 66 coupled between an output of the first driver stage 52 and inputs of the first final stage 54 and the second final stage 56, and the second RF PA 58 further includes a fourth driver stage 68 coupled between an output of the second driver stage 60 and inputs of the third final stage 62 and the fourth final stage 64.

Figure 14:
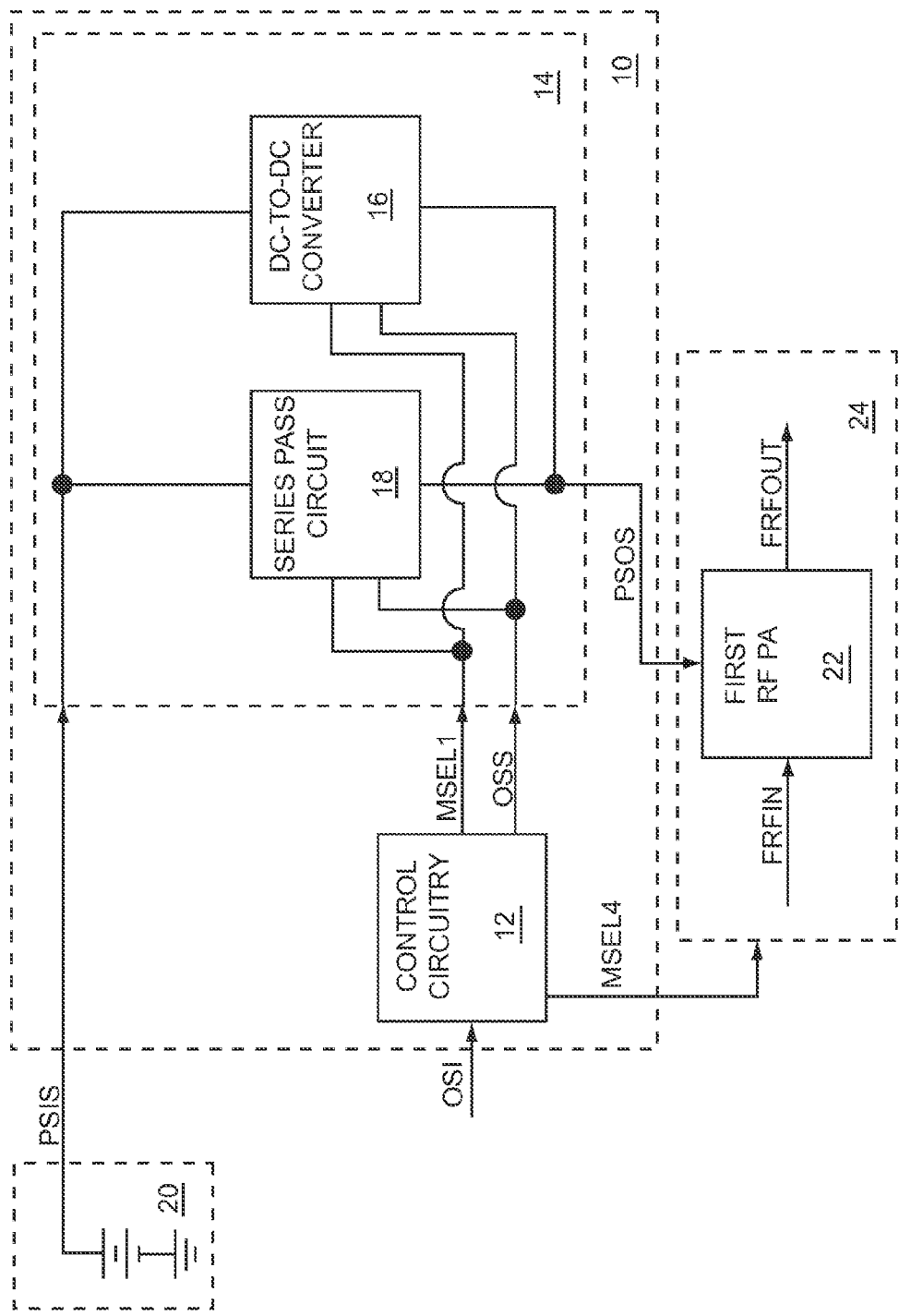
FIG. 14 shows details of the RF communications circuitry and the RF PA circuitry illustrated in FIG. 1 according to other embodiments of the RF communications circuitry and the RF PA circuitry.

FIG. 14 shows details of the RF communications circuitry 10 and the RF PA circuitry 24 illustrated in FIG. 1 according to other embodiments of the RF communications circuitry 10 and the RF PA circuitry 24. The RF communications circuitry 10 and the RF PA circuitry 24 illustrated in FIG. 14 is similar to the RF communications circuitry 10 and the RF PA circuitry 24 illustrated in FIG. 1, except in the RF communications circuitry 10 and the RF PA circuitry 24 illustrated in FIG. 14, the control circuitry 12 provides a fourth mode select signal MSEL4 to the RF PA circuitry 24 and the DC-to-DC converter 16 is a buck-or-boost converter. Further, during the switching supply operating mode, the control circuitry 12 selects between a buck sub-mode and a boost sub-mode and the control circuitry 12 selects between a bypassed final stage sub-mode and a non-bypassed final stage sub-mode. The control circuitry 12 provides the fourth mode select signal MSEL4 based on which of the bypassed final stage sub-mode and the non-bypassed final stage sub-mode is selected. Additionally, the first mode select signal MSEL1 is further based on which of the buck sub-mode and the boost sub-mode is selected. During the buck sub-mode, the DC-to-DC converter 16 operates only in a buck mode and during the boost sub-mode the DC-to-DC converter 16 may operate in either a buck mode or a boost mode based on the output setpoint. As previously mentioned, in one embodiment of the RF PA power supply 14, the power supply input signal PSIS has an input voltage and the power supply output signal PSOS has an output voltage. The control circuitry 12 may be restricted to selecting the boost mode only when the bypassed final stage sub-mode is selected. Therefore, the output voltage may be greater than or equal to the input voltage only when the bypassed final stage sub-mode is selected.

Figure 15:
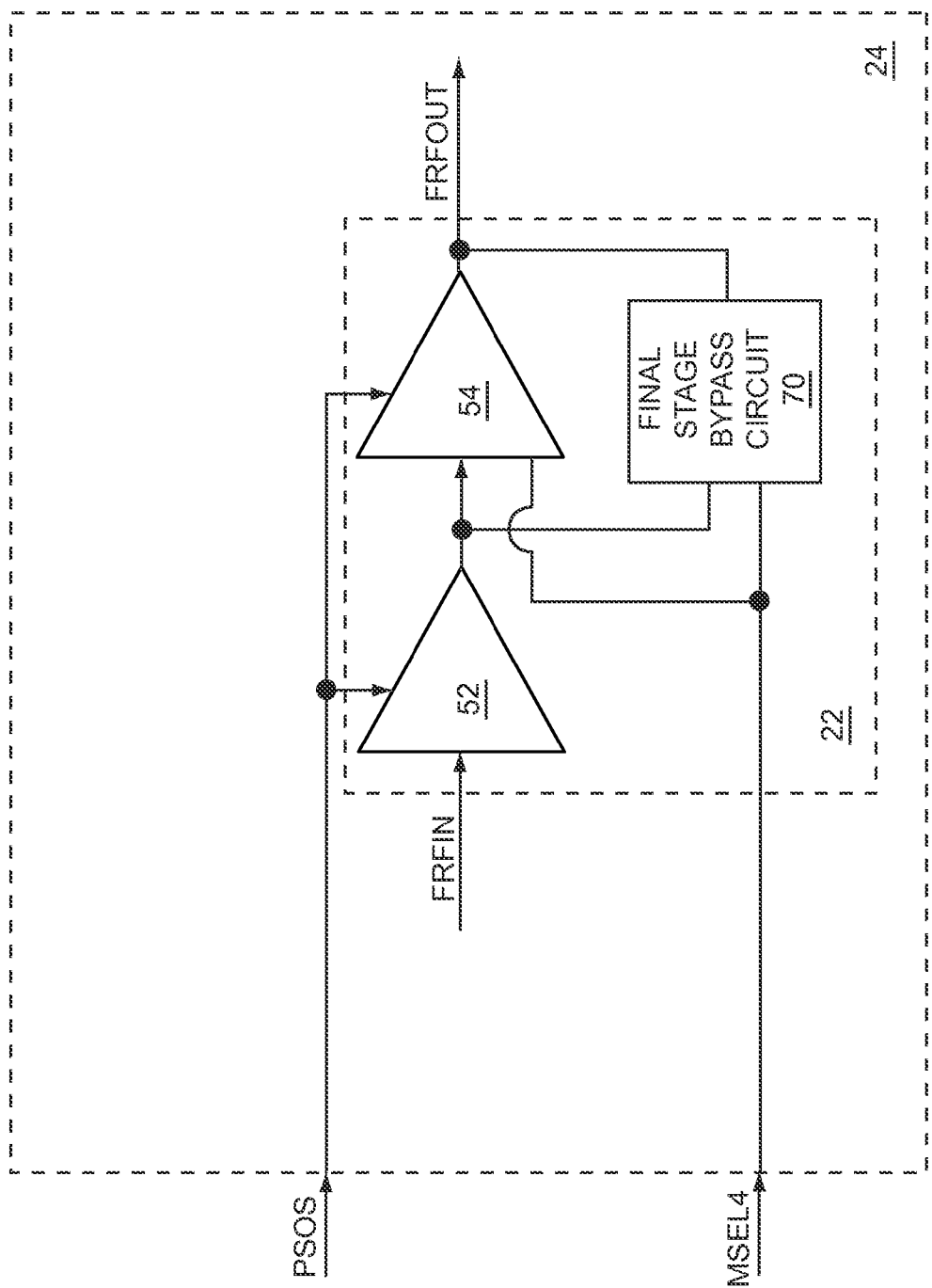
FIG. 15 shows details of RF PA circuitry illustrated in FIG. 14 according to one embodiment of the RF PA circuitry.

FIG. 15 shows details of the RF PA circuitry 24 illustrated in FIG. 14 according to one embodiment of the RF PA circuitry 24. The RF PA circuitry 24 illustrated in FIG. 14 is similar to the RF PA circuitry 24 illustrated in FIG. 9, except in the RF PA circuitry 24 illustrated in FIG. 14, the first RF PA 22 includes a final stage bypass circuit 70 coupled across the first final stage 54. Both the final stage bypass circuit 70 and the first final stage 54 receive the fourth mode select signal MSEL4. During the non-bypassed final stage sub-mode, the first final stage 54 may be operational and the final stage bypass circuit 70 is non-operational, and during the bypassed final stage sub-mode, the first final stage 54 is not operational and the final stage bypass circuit 70 bypasses the first final stage 54.

During the bypassed final stage sub-mode, the first driver stage 52 provides the first RF output signal FRFOUT. Such a condition normally occurs at relatively low output power levels from the first RF PA 22. However, a load line of the first driver stage 52 may be quite different from a load line of the first final stage 54. As a result, under such conditions, the first driver stage 52 may need an output voltage from the power supply output signal PSOS that is greater than an input voltage from the power supply input signal PSIS. Therefore, the DC-to-DC converter 16 may need boost mode capability.

FIGS. 16A through 20 show operational details of the switching circuitry 46 illustrated in FIG. 8 according to one embodiment of the switching circuitry 46. FIGS. 16A through 22 illustrate different switch configurations associated with five different discrete output setpoints of the switching circuitry 46. The switch configurations are controlled by the switching control circuit 50. The switching circuitry 46 includes a first, a second, a third, a fourth, a fifth, a sixth, a seventh, an eighth, and a ninth switching element 72, 74, 76, 78, 80, 82, 84, 86, 88, and a first, a second, and a third capacitive element C1, C2, C3. Capacitances of the first and the second capacitive elements C1, C2 may be about equal to one another. During a first phase of the switching circuitry 46, the power supply input signal PSIS is used to transfer energy to the switching circuitry 46, and during a second phase of the switching circuitry 46, the switching circuitry 46 transfers energy from the switching circuitry 46 using the switching circuitry output signal SCOS.

A first end of the first capacitive element C1 is coupled to a first end of the first switching element 72 and to a first end of the third switching element 76. A second end of the first capacitive element C1 is coupled to a first end of the second switching element 74, to a first end of the fourth switching element 78, and to a first end of the fifth switching element 80. A first end of the second capacitive element C2 is coupled to a second end of the fifth switching element 80, to a first end of the sixth switching element 82 and to a first end of the eighth switching element 86. A second end of the second capacitive element C2 is coupled to a first end of the seventh switching element 84 and to a first end of the ninth switching element 88. The power supply input signal PSIS is fed to a second end of the first switching element 72 and to a second end of the sixth switching element 82. A second end of the third switching element 76 is coupled to a second end of the eighth switching element 86, to a second end of the fourth switching element 78, to a second end of the ninth switching element 88, and to a first end of the third capacitive element C3 to provide the switching circuitry output signal SCOS. A second end of the second switching element 74, a second end of the seventh switching element 84, and a second end of the third capacitive element C3 are coupled to ground.

Figure 16A:
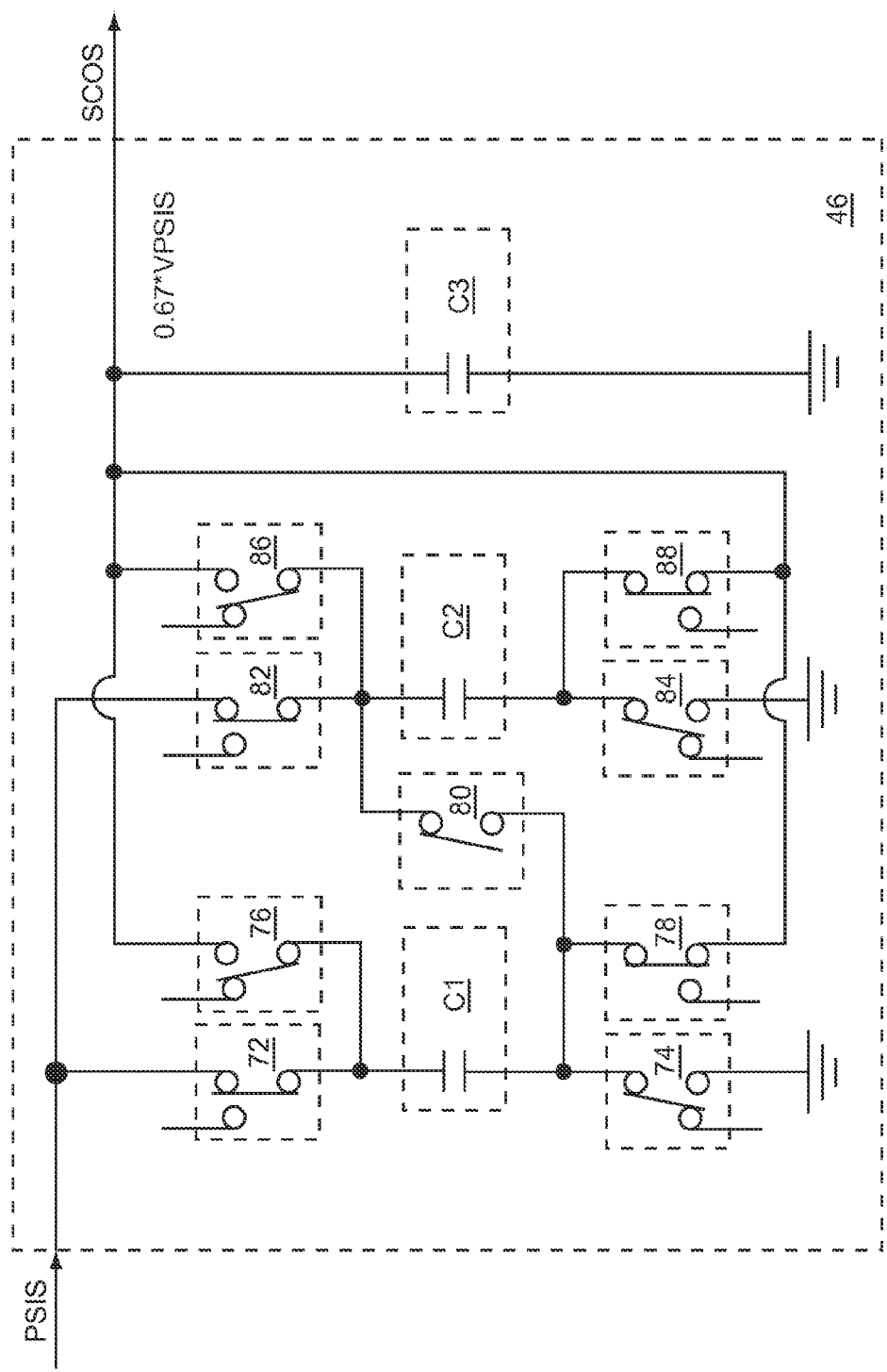
FIGS. 16A through 20 show details of switching circuitry illustrated in FIG. 8 according to one embodiment of the switching circuitry.

FIG. 16A shows a configuration of the switching circuitry 46 during a first phase of a first discrete output setpoint, such that a voltage of the switching circuitry output signal SCOS is intended to be about equal to 0.67 times a voltage of the power supply input signal PSIS, which is a power supply input voltage VPSIS. The first switching element 72, the fourth switching element 78, the sixth switching element 82, and the ninth switching element 88 are all CLOSED, thereby coupling the second end of the first capacitive element C1 and the second end of the second capacitive element C2 to the first end of the third capacitive element C3. The first end of the first capacitive element C1 and the first end of the second capacitive element C2 receive the power supply input signal PSIS. As a result, the parallel combination of the first capacitive element C1 and the second capacitive element C2 are coupled in series with the third capacitive element C3. Therefore, the power supply input voltage VPSIS will divide down such that the voltage across the third capacitive element C3 is about two-thirds of the power supply input voltage VPSIS and the voltage across the second capacitive element C2 and the third capacitive element C3 is about one-third of the power supply input voltage VPSIS.

Figure 16B:
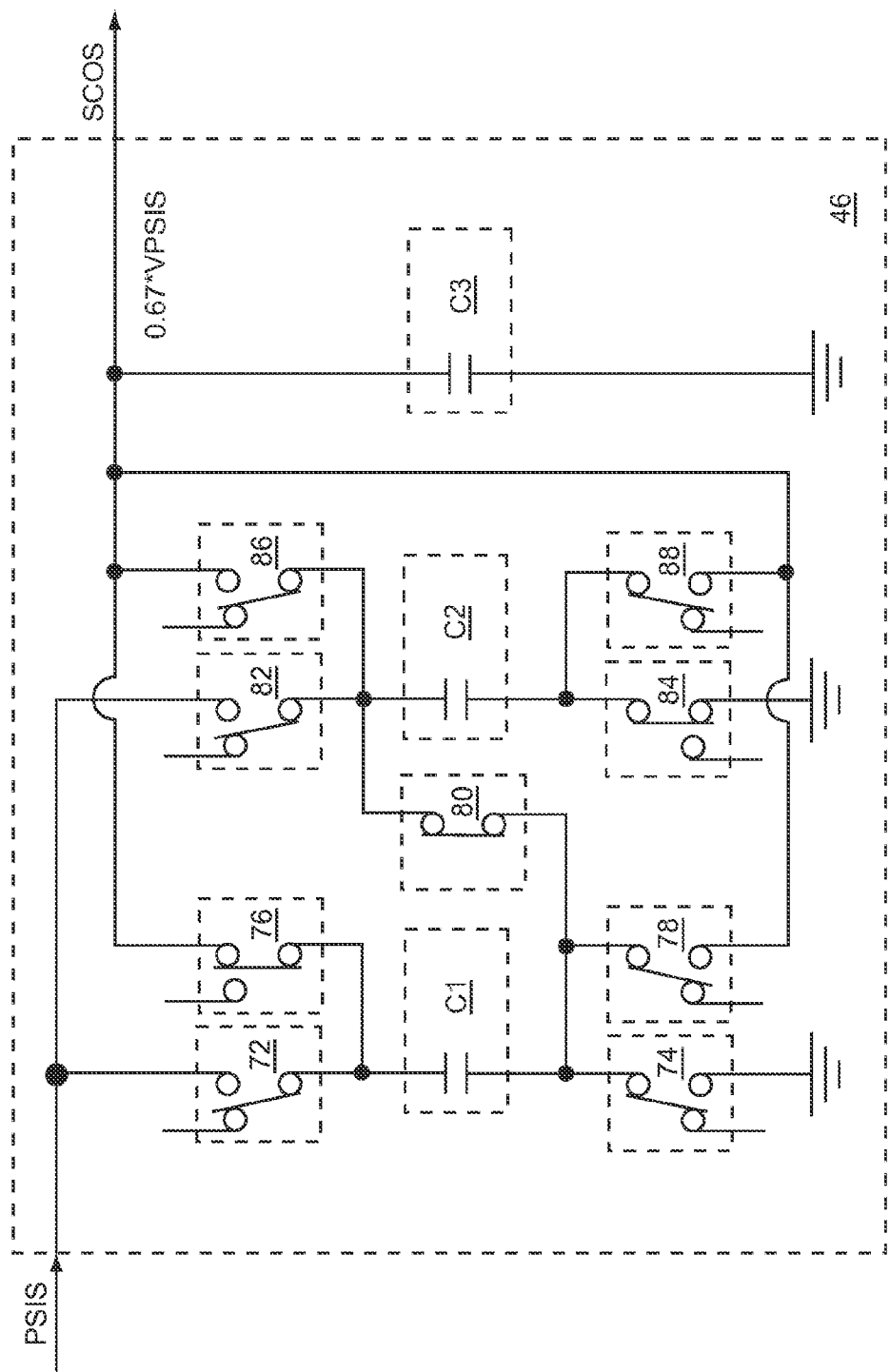

FIG. 16B shows a configuration of the switching circuitry 46 during a second phase of a first discrete output setpoint, such that the voltage of the switching circuitry output signal SCOS is intended to be about equal to 0.67 times the power supply input voltage VPSIS. The third switching element 76, the fifth switching element 80, and the seventh switching element 84 are all CLOSED, thereby coupling the series combination of the first capacitive element C1 and the second capacitive element C2 across the third capacitive element C3. Since in the first phase, the voltage across the third capacitive element C3 was about two-thirds of the power supply input voltage VPSIS, and the voltage across the second capacitive element C2 and the third capacitive element C3 were each about one-third of the power supply input voltage VPSIS, the series combination of the first capacitive element C1 and the second capacitive element C2 provide a voltage equal to about two-thirds of the power supply input voltage VPSIS, which provides proper operation of the switching circuitry 46.

Figure 17A:
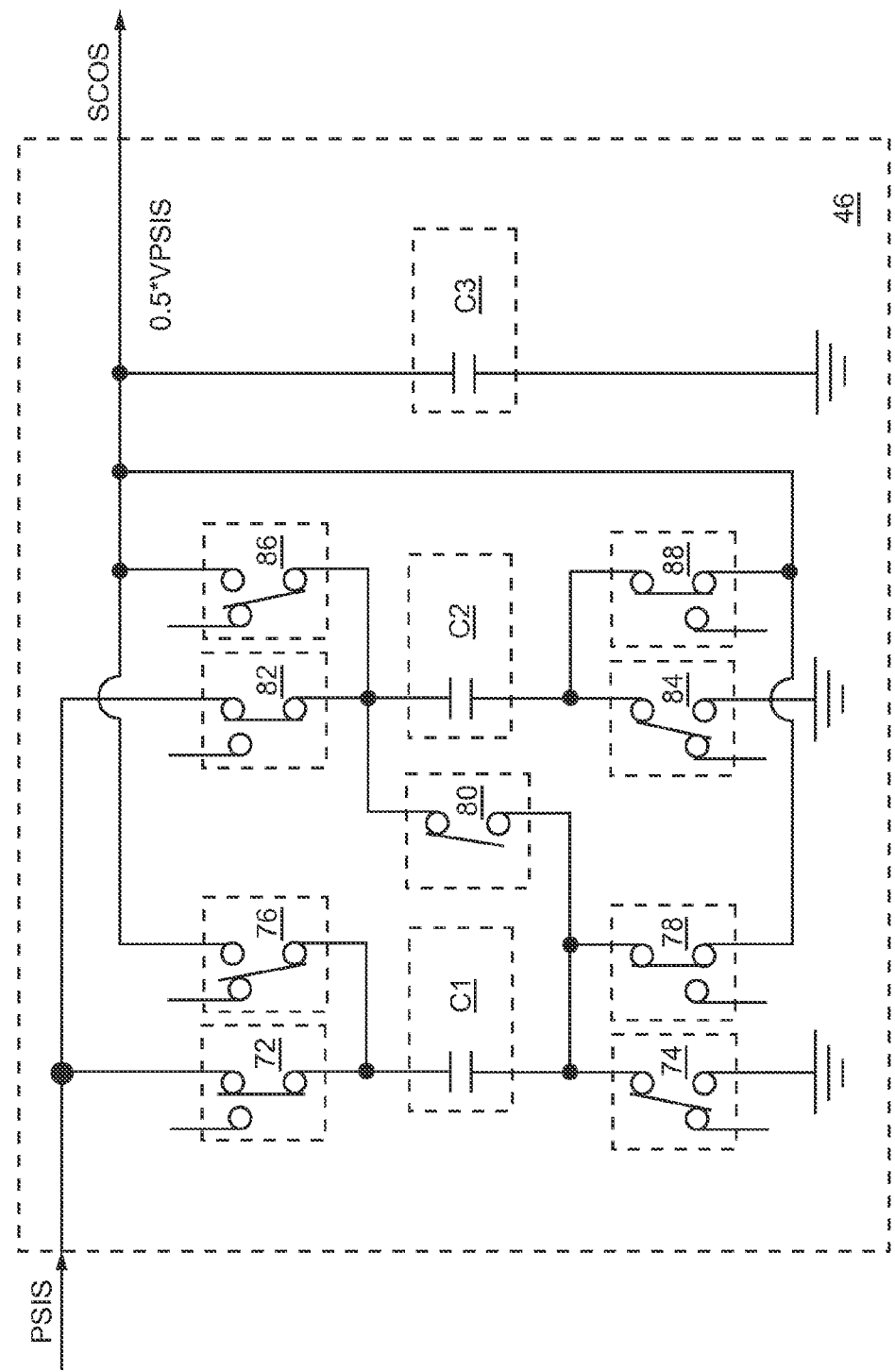

FIG. 17A shows a configuration of the switching circuitry 46 during the first phase of a second discrete output setpoint, such that the voltage of the switching circuitry output signal SCOS is intended to be about equal to 0.5 times the power supply input voltage VPSIS. The first switching element 72, the fourth switching element 78, the sixth switching element 82, and the ninth switching element 88 are all CLOSED, thereby coupling the second end of the first capacitive element C1 and the second end of the second capacitive element C2 to the first end of the third capacitive element C3. The first end of the first capacitive element C1 and the first end of the second capacitive element C2 receive the power supply input signal PSIS. As a result, the parallel combination of the first capacitive element C1 and the second capacitive element C2 are coupled in series with the third capacitive element C3. Therefore, the power supply input voltage VPSIS will divide down such that the voltage across the third capacitive element C3 is about one-half of the power supply input voltage VPSIS and the voltage across the second capacitive element C2 and the third capacitive element C3 is about one-half of the power supply input voltage VPSIS.

Figure 17B:
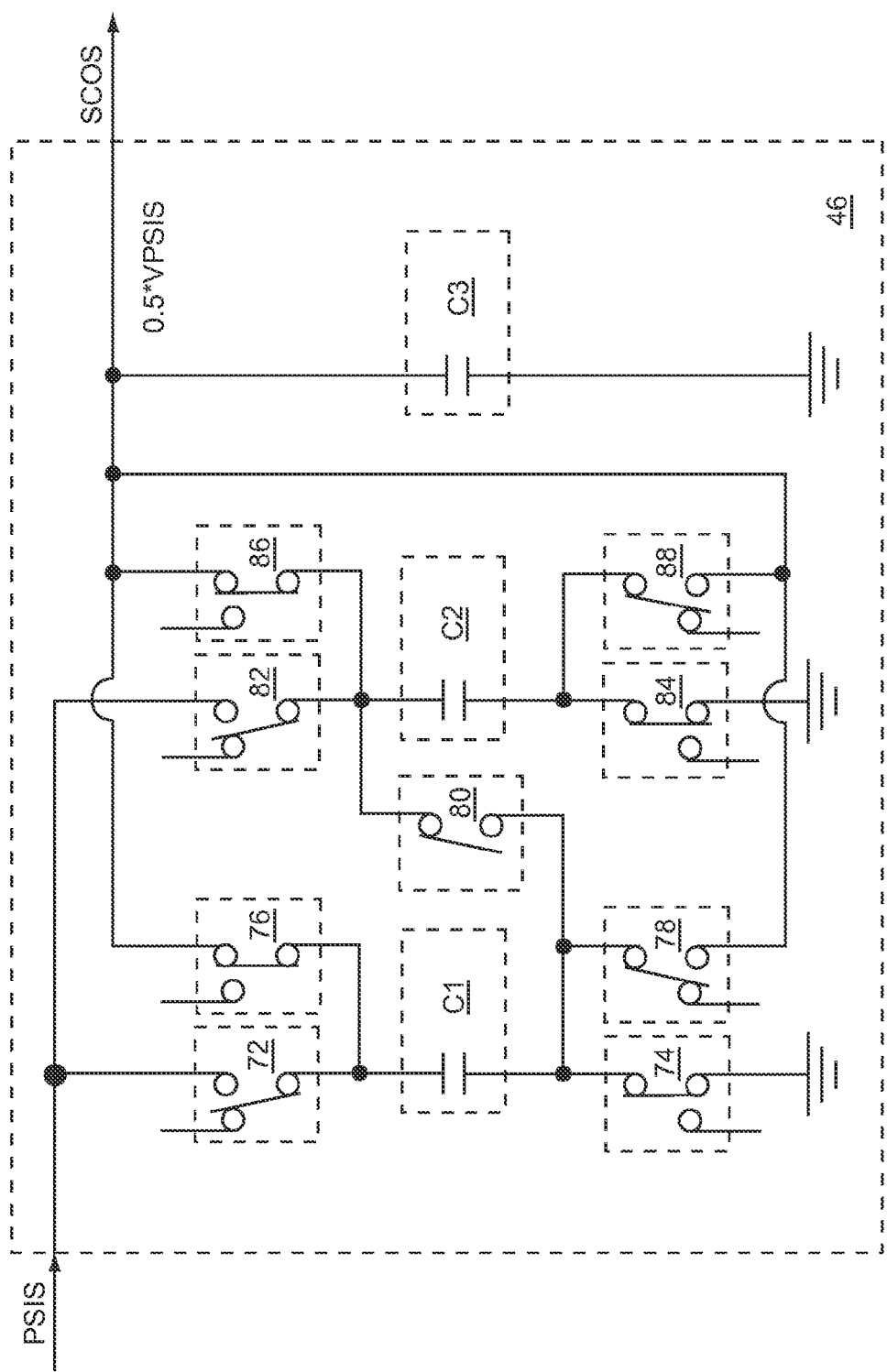

FIG. 17B shows a configuration of the switching circuitry 46 during the second phase of the second discrete output setpoint, such that the voltage of the switching circuitry output signal SCOS is intended to be about equal to 0.5 times the power supply input voltage VPSIS. The second switching element 74, the third switching element 76, the seventh switching element 84, and the eighth switching element 86 are all CLOSED, thereby coupling the first capacitive element C1 and the second capacitive element C2 in parallel across the third capacitive element C3. Since in the first phase, each of the first capacitive element C1 and the second capacitive element C2 had a voltage equal to about one-half of the power supply input voltage VPSIS., when the first and the second capacitive elements C1, C1 are coupled across the third capacitive element C3, they provide a voltage equal to about one-half of the power supply input voltage VPSIS to the third capacitive element C3, which provides proper operation of the switching circuitry 46.

Figure 18A:
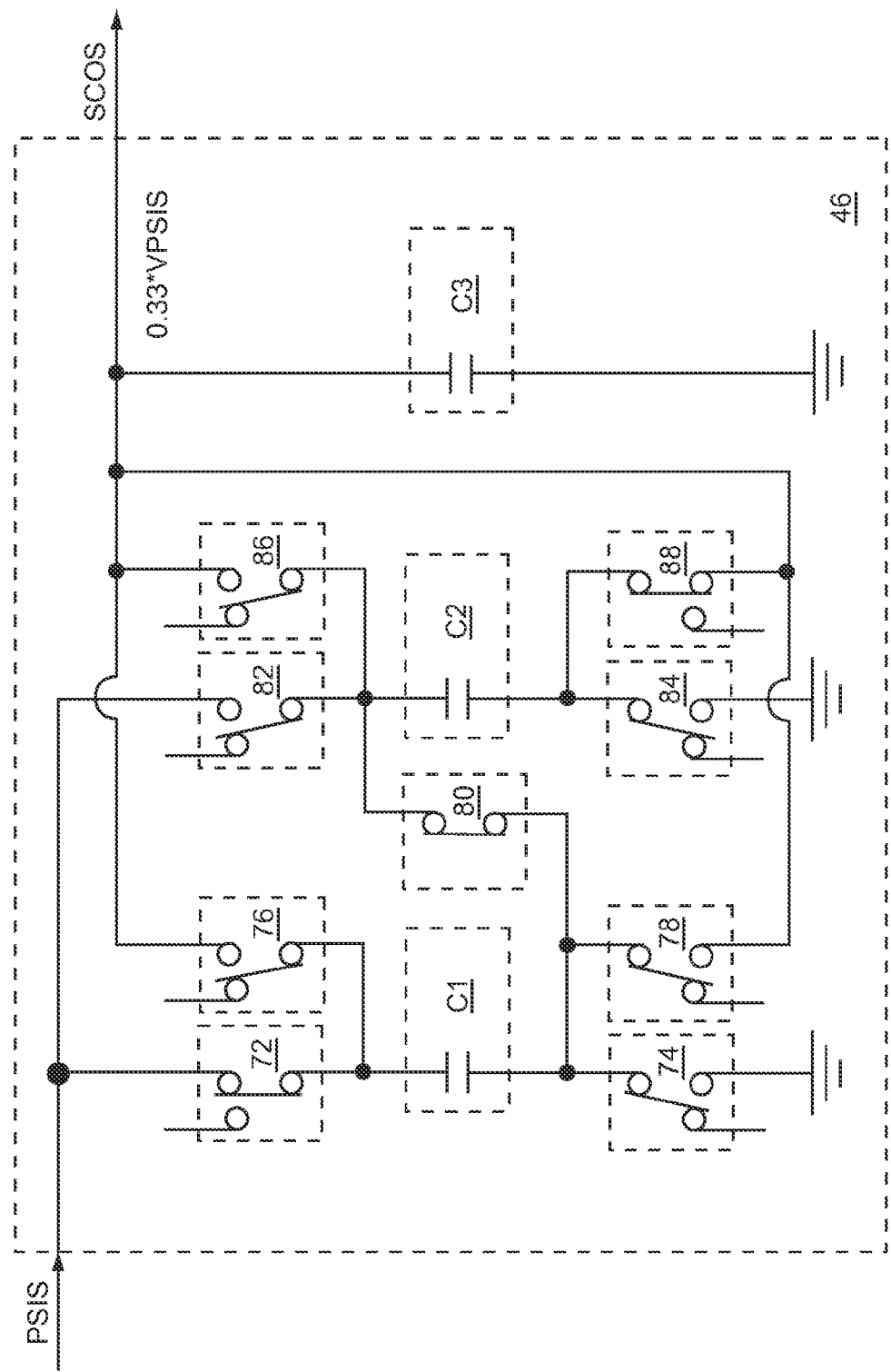

FIG. 18A shows a configuration of the switching circuitry 46 during the first phase of a third discrete output setpoint, such that the voltage of the switching circuitry output signal SCOS is intended to be about equal to 0.33 times the power supply input voltage VPSIS. The first switching element 72, the fifth switching element 80, and the ninth switching element 88 are all CLOSED, thereby coupling the first capacitive element C1, the second capacitive element C2, and the third capacitive element C3 in series. As a result, the power supply input voltage VPSIS is divided evenly between the first capacitive element C1, the second capacitive element C2, and the third capacitive element C3. As such, each of the first, the second, and the third capacitive elements C1, C2, C3 has a voltage equal to about one-third of the power supply input voltage VPSIS.

Figure 18B:
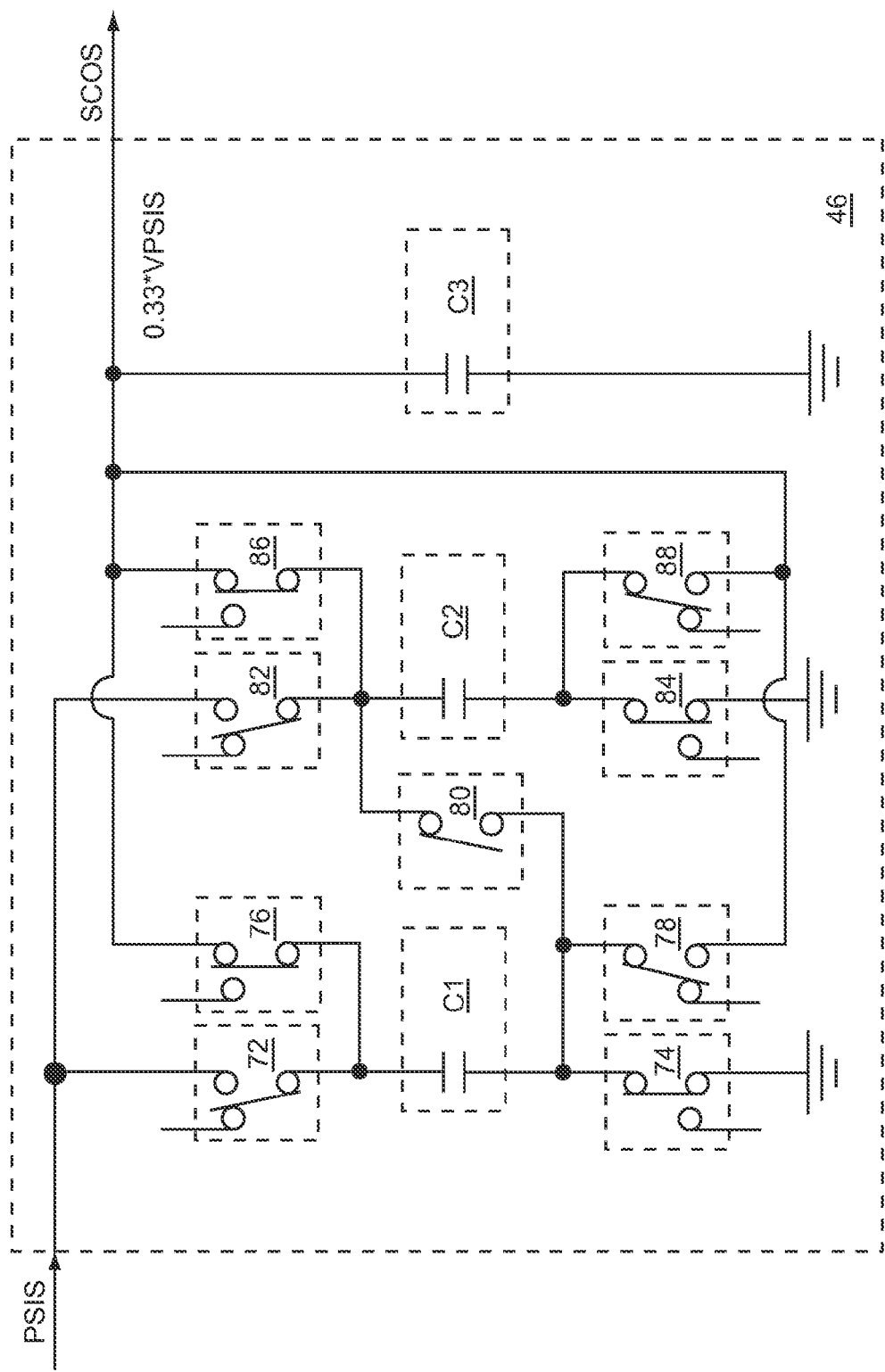

FIG. 18B shows a configuration of the switching circuitry 46 during the second phase of the third discrete output set-point, such that the voltage of the switching circuitry output signal SCOS is intended to be about equal to 0.33 times the power supply input voltage VPSIS. The second switching element 74, the third switching element 76, the seventh switching element 84, and the eighth switching element 86 are all CLOSED, thereby coupling the first capacitive element C1 and the second capacitive element C2 in parallel across the third capacitive element C3. Since in the first phase, each of the first capacitive element C1, the second capacitive element C2, and the third capacitive element C3 had a voltage equal to about one-third of the power supply input voltage VPSIS., when the first and the second capacitive elements C1, C1 are coupled across the third capacitive element C3, they provide a voltage equal to about one-third of the power supply input voltage VPSIS to the third capacitive element C3, which provides proper operation of the switching circuitry 46.

Figure 19A:
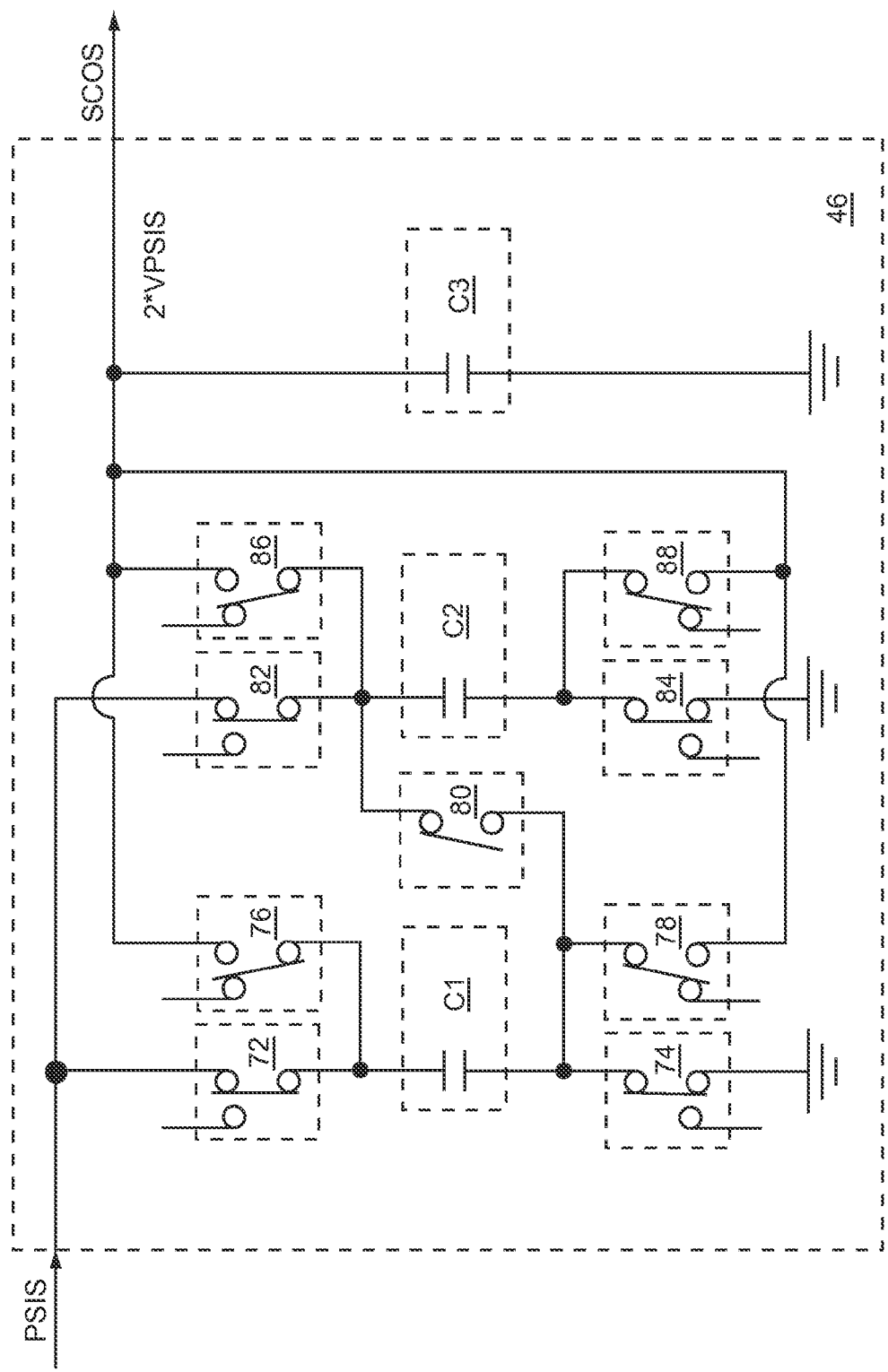

FIG. 19A shows a configuration of the switching circuitry 46 during the first phase of a fourth discrete output setpoint, such that the voltage of the switching circuitry output signal SCOS is intended to be about equal to 2 times the power supply input voltage VPSIS. The first switching element 72, the second switching element 74, the sixth switching element 82, and the seventh switching element 84 are all CLOSED, thereby coupling the first capacitive element C1 and the second capacitive element C2 in parallel to receive the power supply input signal PSIS. As a result, each of the first capacitive element C1 and the second capacitive element C2 has the power supply input voltage VPSIS.

Figure 19B:
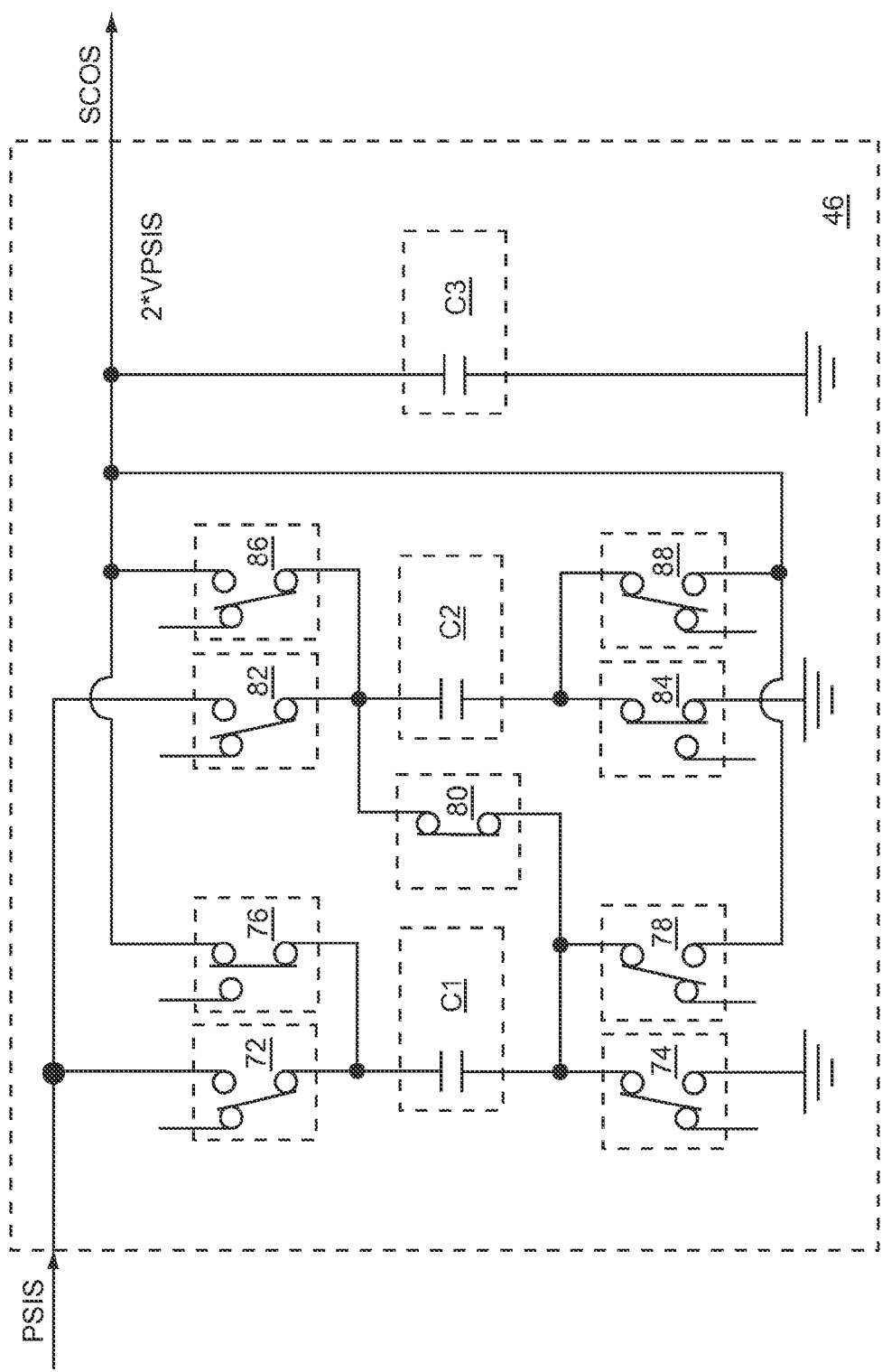

FIG. 19B shows a configuration of the switching circuitry 46 during the second phase of the fourth discrete output setpoint, such that the voltage of the switching circuitry output signal SCOS is intended to be about equal to 2 times the power supply input voltage VPSIS. The third switching element 76, the fifth switching element 80, and the seventh switching element 84 are all CLOSED, thereby coupling the series combination of the first capacitive element C1 and the second capacitive element C2 across the third capacitive element C3. Since in the first phase, the voltage across first capacitive element C1 was about equal to the power supply input voltage VPSIS, and since the voltage across the second capacitive element C2 was about equal to the power supply input voltage VPSIS, the series combination of the first capacitive element C1 and the second capacitive element C2 provides a voltage equal to about two times the power supply input voltage VPSIS, which provides proper operation of the switching circuitry 46.

Figure 20:
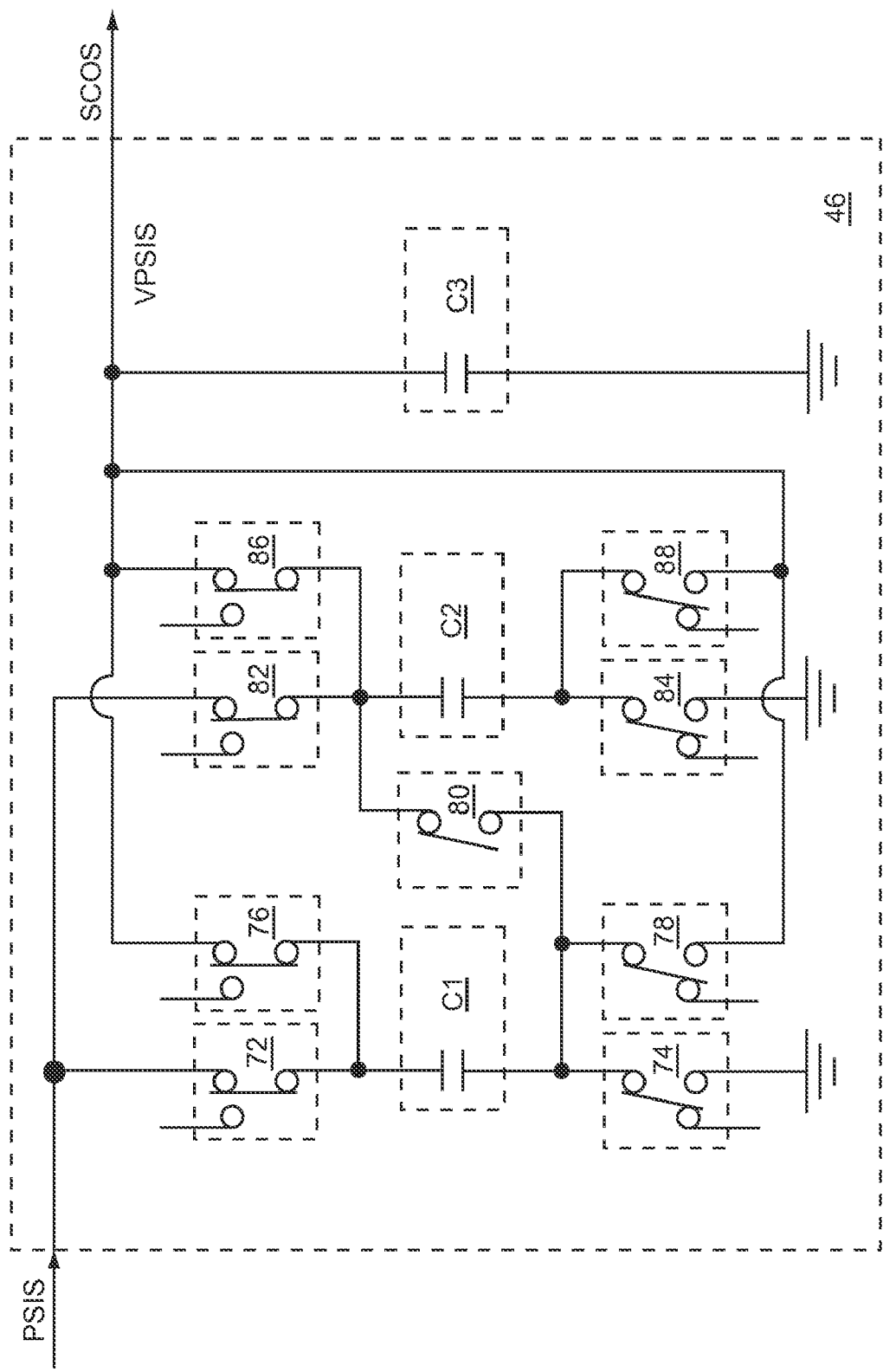

FIG. 20 shows a configuration of the switching circuitry 46 during the first phase and the second phase of a fifth discrete output setpoint, such that the voltage of the switching circuitry output signal SCOS is intended to be about equal to the power supply input voltage VPSIS. The first switching element 72, the third switching element 76, the sixth switching element 82, and the eighth switching element 86 are all CLOSED, thereby coupling an input of the switching circuitry 46 to an output of the switching circuitry 46. As a result, the switching circuitry output signal SCOS is about equal to the power supply input signal PSIS. As such, the voltage of the switching circuitry output signal SCOS may be about equal to the power supply input voltage VPSIS.

FIG. 21 is a graph illustrating the relationship between the output setpoint signal OSS and the power supply output signal PSOS associated with the RF communications circuitry 10 according to one embodiment of the output setpoint signal OSS. The output setpoint may vary in a continuous manner, such as amplitude modulation of the output setpoint, may have multiple discrete steps, or both. Therefore, the output setpoint signal OSS may vary in a continuous manner, as illustrated in FIG. 3, may have multiple discrete steps, as illustrated in FIG. 21, or both. Using discrete steps may be beneficial when changing an output power level from the first final stage 54 (FIG. 15). For example, if the RF communications circuitry 10 dropped the output power level from the final stage 54 in response to a communications session by dropping an amplitude of the first RF input signal FRFIN, then to save power, the RF communications circuitry 10 may drop the output setpoint accordingly. As a result, the final stage bypass circuit 70 may be eliminated in some applications.

Some of the circuitry previously described may use discrete circuitry, integrated circuitry, programmable circuitry, non-volatile circuitry, volatile circuitry, software executing instructions on computing hardware, firmware executing instructions on computing hardware, the like, or any combination thereof. The computing hardware may include mainframes, micro-processors, micro-controllers, DSPs, the like, or any combination thereof.

None of the embodiments of the present disclosure are intended to limit the scope of any other embodiment of the present disclosure. Any or all of any embodiment of the present disclosure may be combined with any or all of any other embodiment of the present disclosure to create new embodiments of the present disclosure.

Those skilled in the art will recognize improvements and modifications to the preferred embodiments of the present disclosure. All such improvements and modifications are considered within the scope of the concepts disclosed herein and the claims that follow.

What is claimed is:

1. Radio frequency (RF) communications circuitry comprising:
    control circuitry adapted to provide an output setpoint signal containing an output setpoint and select between a switching supply operating mode and a non-switching supply operating mode based on the output setpoint; and
    an RF power amplifier (PA) power supply adapted to receive the output setpoint signal and provide a power supply output signal and comprising:
        a direct current (DC)-to-DC converter adapted to, during the switching supply operating mode:
            receive a power supply input signal; and
            provide the power supply output signal to a first RF PA that is based on a DC-to DC conversion of the power supply input signal and the output setpoint; and
        a series pass circuit coupled across the DC-to-DC converter and adapted to, during the non-switching supply operating mode:
            receive the power supply input signal; and
            provide the power supply output signal to the first RF PA that is based on the power supply input signal and provided without DC-to-DC conversion.

2. The RF communications circuitry of claim 1 wherein, during the switching supply operating mode:
    the DC-to-DC converter is a buck-only converter;
    the power supply input signal has an input voltage;
    the power supply output signal has an output voltage; and
    the output voltage is less than the input voltage.

3. The RF communications circuitry of claim 1 wherein, during the switching supply operating mode:
    the DC-to-DC converter is a buck-or-boost converter;
    the power supply input signal has an input voltage;
    the power supply output signal has an output voltage; and the output voltage is less than, greater than, or equal to the input voltage.

4. The RF communications circuitry of claim 1 wherein the control circuitry is adapted to select the switching supply operating mode when the output setpoint is less than or equal to about a first threshold and select the non-switching supply operating mode when the output setpoint is greater than about the first threshold.

5. The RF communications circuitry of claim 1 wherein the series pass circuit comprises a series pass transistor element coupled across the DC-to-DC converter and during the non-switching supply operating mode:
    the control circuitry is further adapted to select between a by-pass operating sub-mode and a regulating sub-mode based on the output setpoint;
    during the by-pass operating sub-mode, the series pass transistor element operates in an ON state; and
    during the regulating sub-mode, the series pass transistor element is adapted to provide the power supply output signal to the first RF PA based on the power supply input signal and the output setpoint.

6. The RF communications circuitry of claim 5 wherein the control circuitry is adapted to:
    select the switching supply operating mode when the output setpoint is less than or equal to about a first threshold;
    select the non-switching supply operating mode when the output setpoint is greater than about the first threshold;
    select the regulating sub-mode when the output setpoint is less than or equal to about a second threshold; and
    select the bypass operating sub-mode when the output setpoint is greater than about the second threshold,
    wherein the second threshold is greater than the first threshold.

7. The RF communications circuitry of claim 6 wherein the output setpoint is set to a fixed value.

8. The RF communications circuitry of claim 6 wherein during the regulating sub-mode, the output setpoint is based on a desired RF output power from the first RF PA, and during the switching supply operating mode, the output setpoint is based on the desired RF output power from the first RF PA.

9. The RF communications circuitry of claim 8 wherein during the regulating sub-mode, a magnitude of an RF output power from the first RF PA is based on a magnitude of the power supply output signal, and during the switching supply operating mode, the magnitude of the RF output power from the first RF PA is based on the magnitude of the power supply output signal.

10. The RF communications circuitry of claim 1 wherein the DC-to-DC converter is coupled to at least a first inductive element, which is used as an energy transfer element to provide the power supply output signal during the switching supply operating mode.

11. The RF communications circuitry of claim 1 wherein the DC-to-DC converter comprises:
    switching circuitry adapted to during the switching supply operating mode, receive the power supply input signal and provide a switching circuitry output signal based on the power supply input signal and the output setpoint; and
    a series low drop-out (LDO) regulator adapted to during the switching supply operating mode, receive the switching circuitry output signal and provide the power supply output signal based on the switching circuitry output signal and the output setpoint.

12. The RF communications circuitry of claim 11 wherein the switching circuitry comprises a plurality of capacitive elements, which are used as energy transfer elements to provide the switching circuitry output signal during the switching supply operating mode.

13. The RF communications circuitry of claim 12 wherein the plurality of capacitive elements consists of two capacitive elements.

14. The RF communications circuitry of claim 12 wherein the DC-to-DC converter further comprises a switching control circuit, which during the switching supply operating mode is adapted to select one of a plurality of discrete output setpoints based on the power supply input signal and the output setpoint.

15. The RF communications circuitry of claim 14 wherein the series pass circuit is further adapted to during the switching supply operating mode, contribute to the power supply output signal to smooth transitions when selecting between one of the plurality of discrete output setpoints and another of the plurality of discrete output setpoints.

16. The RF communications circuitry of claim 1 wherein the series pass circuit is further adapted to during the switching supply operating mode, contribute to the power supply output signal to assist the DC-to-DC converter in regulating the power supply output signal.

17. The RF communications circuitry of claim 1 wherein the first RF PA comprises:
at least a first driver stage adapted to feed a first final stage and receive the power supply output signal; and
the first final stage adapted to receive the power supply output signal.

18. The RF communications circuitry of claim 17 wherein:
the at least the first driver stage is further adapted to feed a second final stage;
the control circuitry is further adapted to select between a full duplex operating mode and a half duplex operating mode;
during the full duplex operating mode, the second final stage is inactive;
during the half duplex operating mode, the first final stage is inactive.

19. The RF communications circuitry of claim 18 wherein the second final stage is adapted to receive the power supply input signal.

20. The RF communications circuitry of claim 17 wherein:
during the switching supply operating mode, the DC-to-DC converter is further adapted to provide the power supply output signal to at least a second driver stage and to a third final stage based on the power supply input signal and the output setpoint;
during the non-switching supply operating mode, the series pass circuit is further adapted to provide the power supply output signal to the at least the second driver stage and to the third final stage based on the power supply input signal;
the at least the second driver stage is adapted to feed the third final stage and a fourth final stage;
the at least the first driver stage is further adapted to feed a second final stage;
the control circuitry is further adapted to select one of a high band full duplex operating mode, a low band full duplex operating mode, a high band half duplex operating mode, and a low band half duplex operating mode;
during the high band full duplex operating mode, the second final stage is inactive, the third final stage is inactive, and the fourth final stage is inactive;
during the high band half duplex operating mode, the first final stage is inactive, the third final stage is inactive, and the fourth final stage is inactive;
during the low band full duplex operating mode, the second final stage is inactive, the first final stage is inactive, and the fourth final stage is inactive; and
during the low band half duplex operating mode, the first final stage is inactive, the third final stage is inactive, and the second final stage is inactive.

21. The RF communications circuitry of claim 20 wherein the second final stage is adapted to receive the power supply input signal and the fourth final stage is adapted to receive the power supply input signal.

22. The RF communications circuitry of claim 1 wherein the output setpoint comprises a plurality of discrete steps.

23. The RF communications circuitry of claim 1 wherein a battery is adapted to provide the power supply input signal.

24. The RF communications circuitry of claim 1 wherein:
the first RF PA comprises at least a first driver stage adapted to feed a final stage, the final stage, and a final stage bypass circuit coupled across the final stage;
the control circuitry is further adapted to select between a bypassed final stage sub-mode and a non-bypassed final stage sub-mode;
during the bypassed final stage sub-mode, the final stage is not operational and the final stage bypass circuit bypasses the final stage;
the DC-to-DC converter is a buck-or-boost converter;
the control circuitry is further adapted to select between a buck sub-mode and a boost sub-mode;
the power supply input signal has an input voltage;
the power supply output signal has an output voltage; and
when the output voltage is greater than or equal to the input voltage, the bypassed final stage sub-mode is selected.

25. A method comprising:
selecting between a switching supply operating mode and a non-switching supply operating mode based on an output setpoint;
generating at control circuitry an output setpoint signal containing the output setpoint;
receiving, at an RF power amplifier power supply the output setpoint signal;
during the switching supply operating mode, providing a power supply output signal to a first radio frequency (RF) power amplifier (PA) using a direct current (DC)-to-DC converter based on a power supply input signal and the output setpoint; and
during the non-switching supply operating mode, providing the power supply output signal to the first RF PA using a series pass circuit, which is coupled in parallel with the DC-to-DC converter, based on the power supply input signal and the output setpoint.

* * * * *